United States Patent
Goto et al.

(10) Patent No.: US 9,822,209 B2
(45) Date of Patent: Nov. 21, 2017

(54) METHOD FOR DECOMPOSING POLYMER MATERIAL, METHOD FOR PRODUCING RECYCLED RESIN, AND METHOD FOR RECOVERING INORGANIC FILLER

(71) Applicant: SUMITOMO BAKELITE CO., LTD., Tokyo (JP)

(72) Inventors: Junya Goto, Tokyo (JP); Masaki Ishikawa, Tokyo (JP); Tamotsu Orihara, Tokyo (JP); Taichi Koide, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 37 days.

(21) Appl. No.: 14/740,569

(22) Filed: Jun. 16, 2015

(65) Prior Publication Data
US 2015/0299371 A1    Oct. 22, 2015

Related U.S. Application Data

(62) Division of application No. 13/058,333, filed as application No. PCT/JP2009/004464 on Sep. 9, 2009, now Pat. No. 9,085,666.

(30) Foreign Application Priority Data

Dec. 25, 2008  (JP) ................ 2008-330855
Sep. 12, 2009  (JP) ................ 2008-234627

(51) Int. Cl.
*C08G 8/28*   (2006.01)
*C08G 8/04*   (2006.01)
(Continued)

(52) U.S. Cl.
CPC ............... *C08G 8/28* (2013.01); *C01B 33/12* (2013.01); *C08G 8/04* (2013.01); *C08J 11/14* (2013.01);
(Continued)

(58) Field of Classification Search
CPC ... C01B 33/12; C08G 8/04; C08G 8/28; C08J 11/14; C08J 11/16; C08J 11/24;
(Continued)

(56) References Cited

U.S. PATENT DOCUMENTS 6,410,607 B1   6/2002  Ekart et al.
7,851,514 B2  12/2010  Goto et al.
(Continued)

FOREIGN PATENT DOCUMENTS

EP   1829920 A1    9/2007
JP   2001055468 A  2/2001
(Continued)

OTHER PUBLICATIONS

Office Action for corresponding Japanese Application No. 2013-156653, dated Oct. 21, 2014, 2 pages.
(Continued)

*Primary Examiner* — Frances Tischler
(74) *Attorney, Agent, or Firm* — Ditthavong & Steiner, P.C.

(57) ABSTRACT

The present invention is a method for decomposing a polymer material by chemically decomposing a polymer material containing a first monomer and a second monomer in a mixture of the polymer material with the first monomer or a derivative of the first monomer to produce a chemical raw material. A relationship between a proportion of number of molecules of the second monomer to number of molecules of the first monomer in a reaction system for decomposing the polymer material and the molecular weight of the chemical raw material produced in the reaction system is acquired in advance (S101). Subsequently, an addition mount of the derivative of the first monomer to be added to the polymer material is determined based on the above relationship (S102). The first monomer in the addition
(Continued)

amount determined is then mixed with the polymer material (S103).

12 Claims, 13 Drawing Sheets

(51) Int. Cl.
C08J 11/14 (2006.01)
C08J 11/16 (2006.01)
C08J 11/24 (2006.01)
C08L 61/06 (2006.01)
C01B 33/12 (2006.01)
C08K 7/06 (2006.01)
C08K 7/14 (2006.01)
D01F 9/12 (2006.01)

(52) U.S. Cl.
CPC ............... *C08J 11/16* (2013.01); *C08J 11/24* (2013.01); *C08K 7/06* (2013.01); *C08K 7/14* (2013.01); *C08L 61/06* (2013.01); *D01F 9/12* (2013.01); *C08J 2361/06* (2013.01); *Y02P 20/582* (2015.11); *Y02W 30/704* (2015.05); *Y02W 30/705* (2015.05); *Y02W 30/706* (2015.05)

(58) Field of Classification Search
CPC .......... C08J 2361/06; C08K 7/06; C08K 7/14; C08L 61/06; D01F 9/12; Y02P 20/582; Y02W 30/704; Y02W 30/705; Y02W 30/706

USPC .................................................. 521/40–49.8
See application file for complete search history.

(56) References Cited

U.S. PATENT DOCUMENTS

2009/0215912 A1   8/2009   Goto et al.
2009/0318576 A1   12/2009  Goto et al.

FOREIGN PATENT DOCUMENTS

| JP | 2001151933 A | 6/2001 |
| JP | 2002536519 A | 10/2002 |
| JP | 2003253041 A | 9/2003 |
| JP | 2004115744 A | 4/2004 |
| JP | 2005054138 A | 3/2005 |
| JP | 2006124480 A | 5/2006 |
| JP | 2006160794 A | 6/2006 |
| JP | 2006233141 A | 9/2006 |
| WO | 0047659 A1 | 8/2000 |
| WO | 2007032047 A1 | 3/2007 |

OTHER PUBLICATIONS

European Office Action for related European Patent Application No. 09812882.0, dated Jul. 16, 2014, 9 pages.
International Search Report for International Application No. PCT/JP2009/004464, dated Dec. 22, 2009.

[Fig. 1]
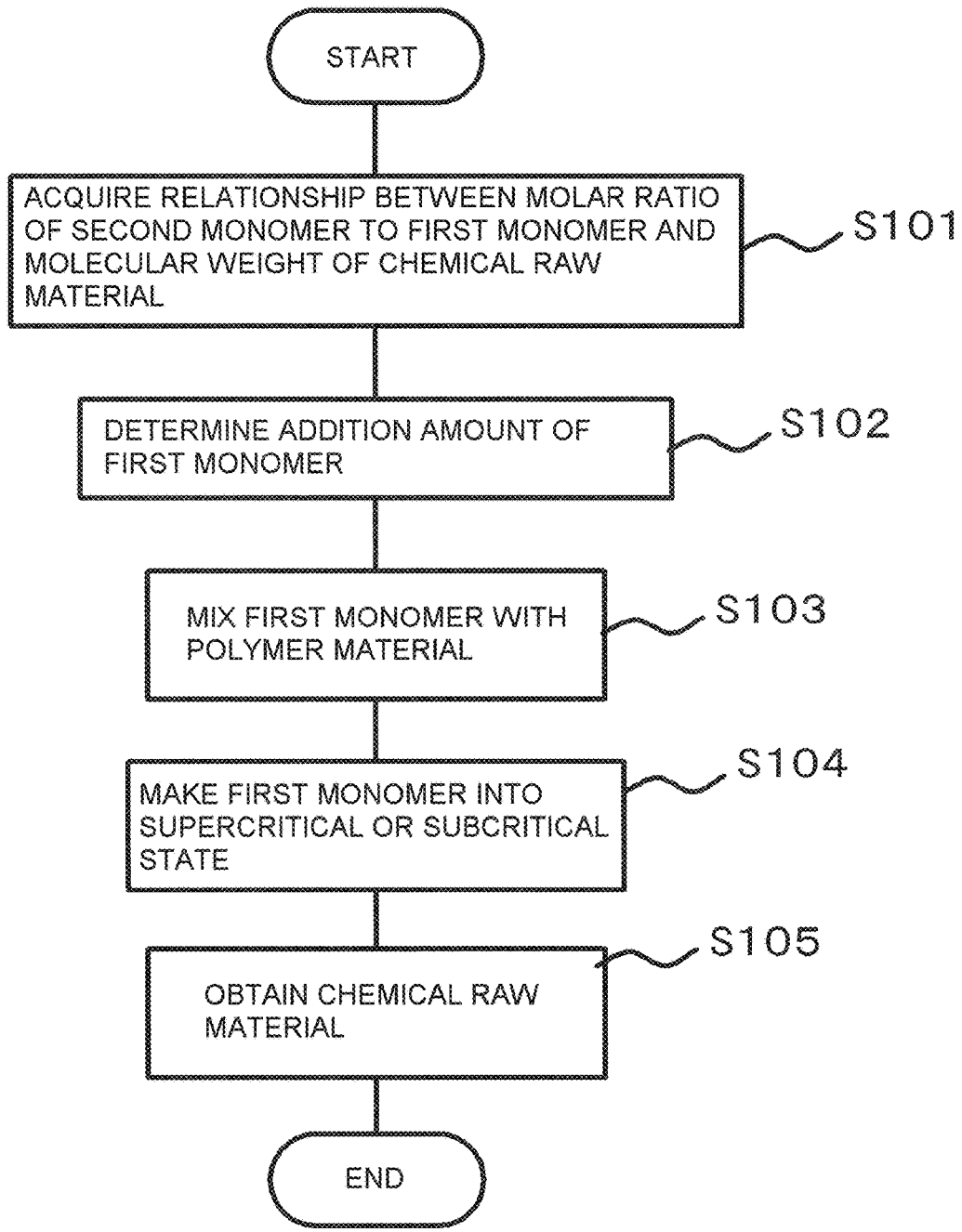

[Fig. 2]
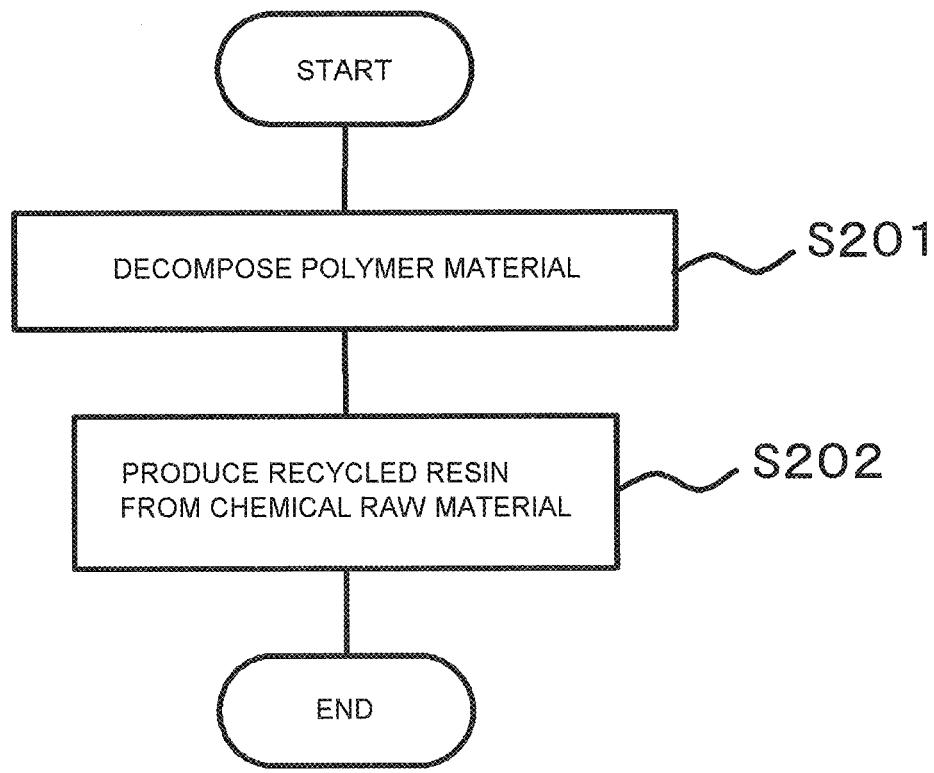
[Fig. 3]
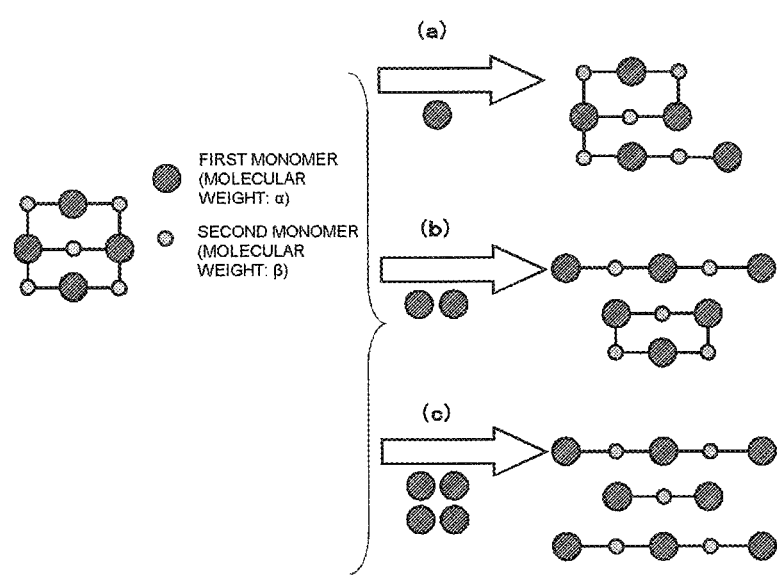

[Fig. 4]
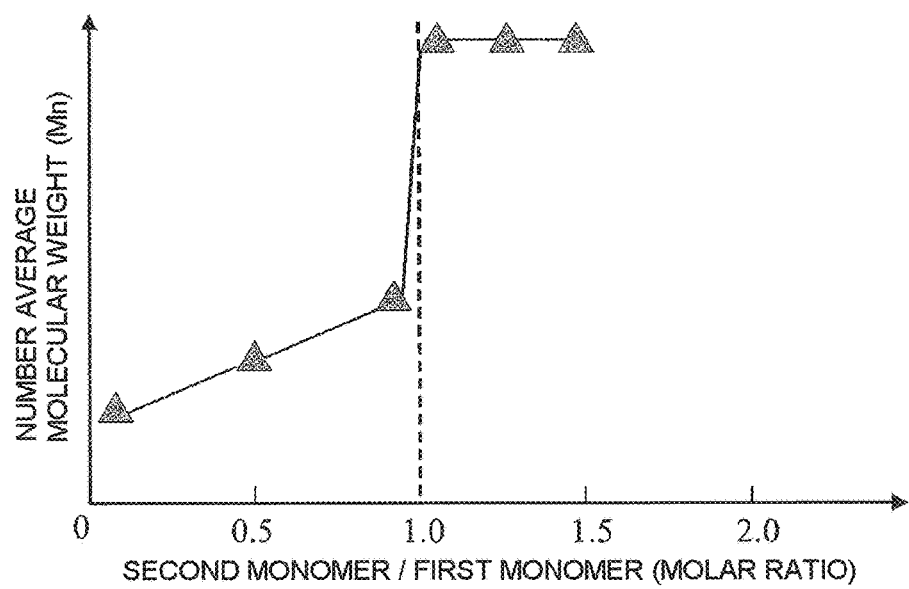

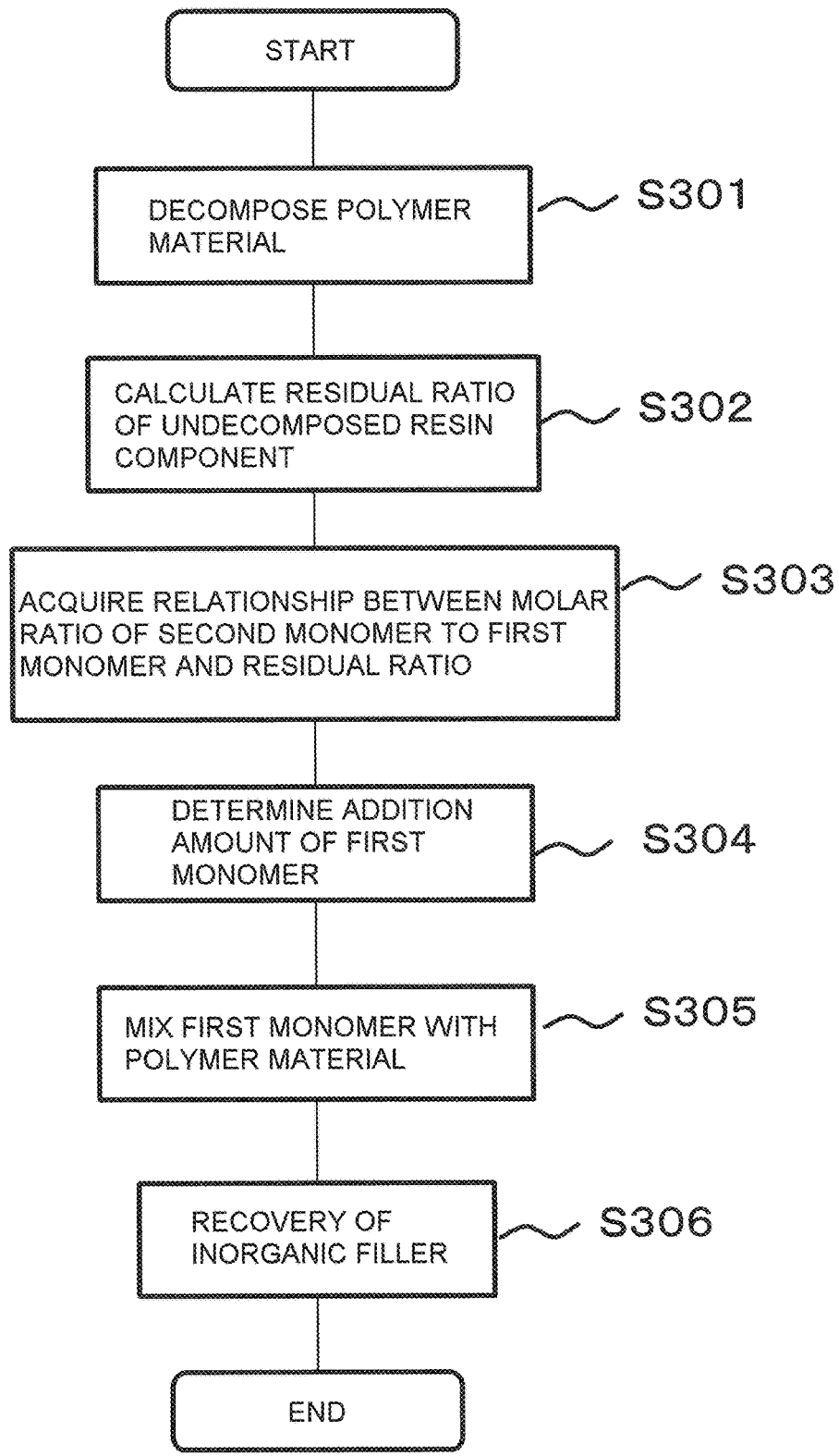
[Fig. 5]

[Fig. 6]
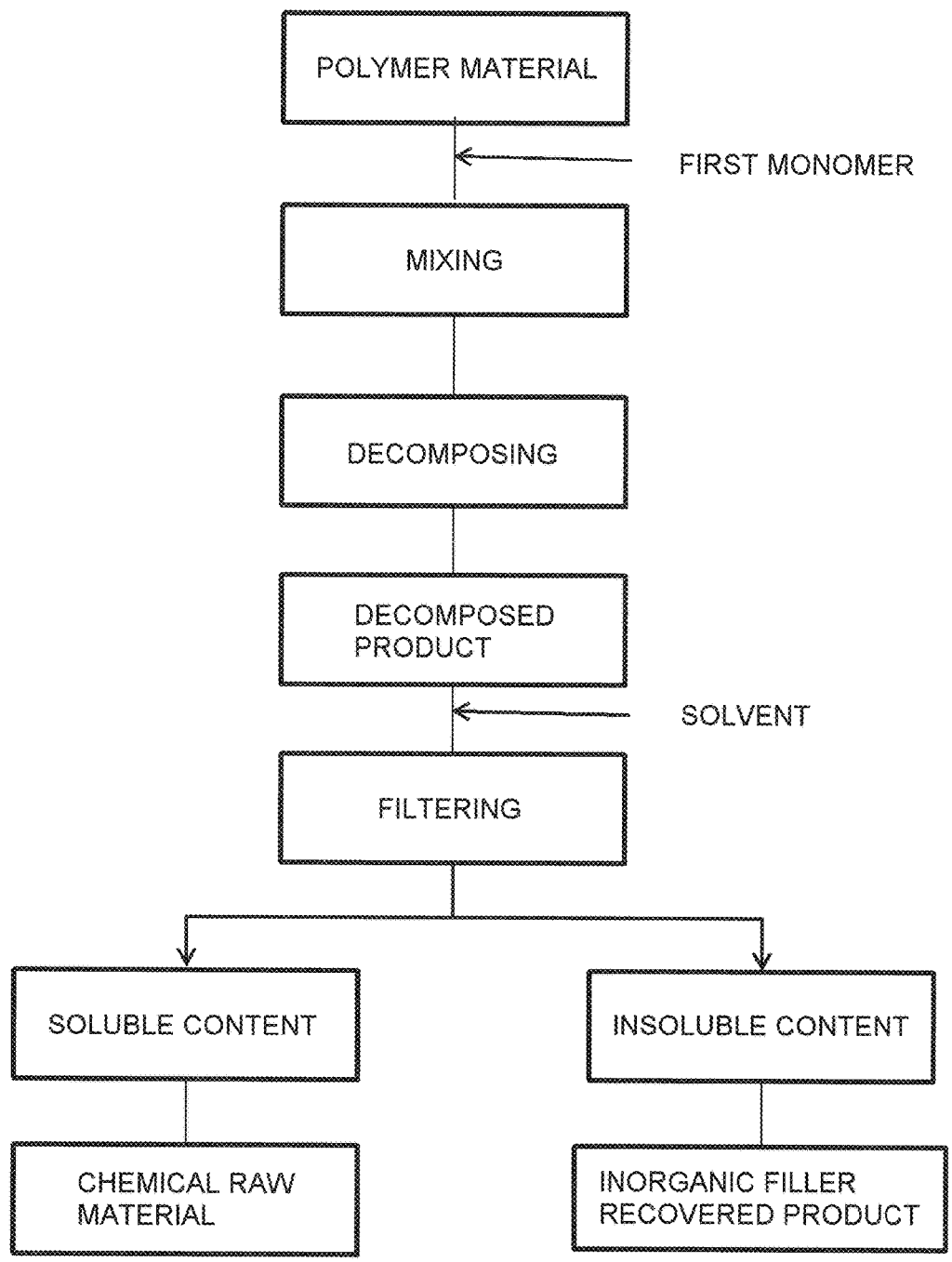

[Fig. 7]
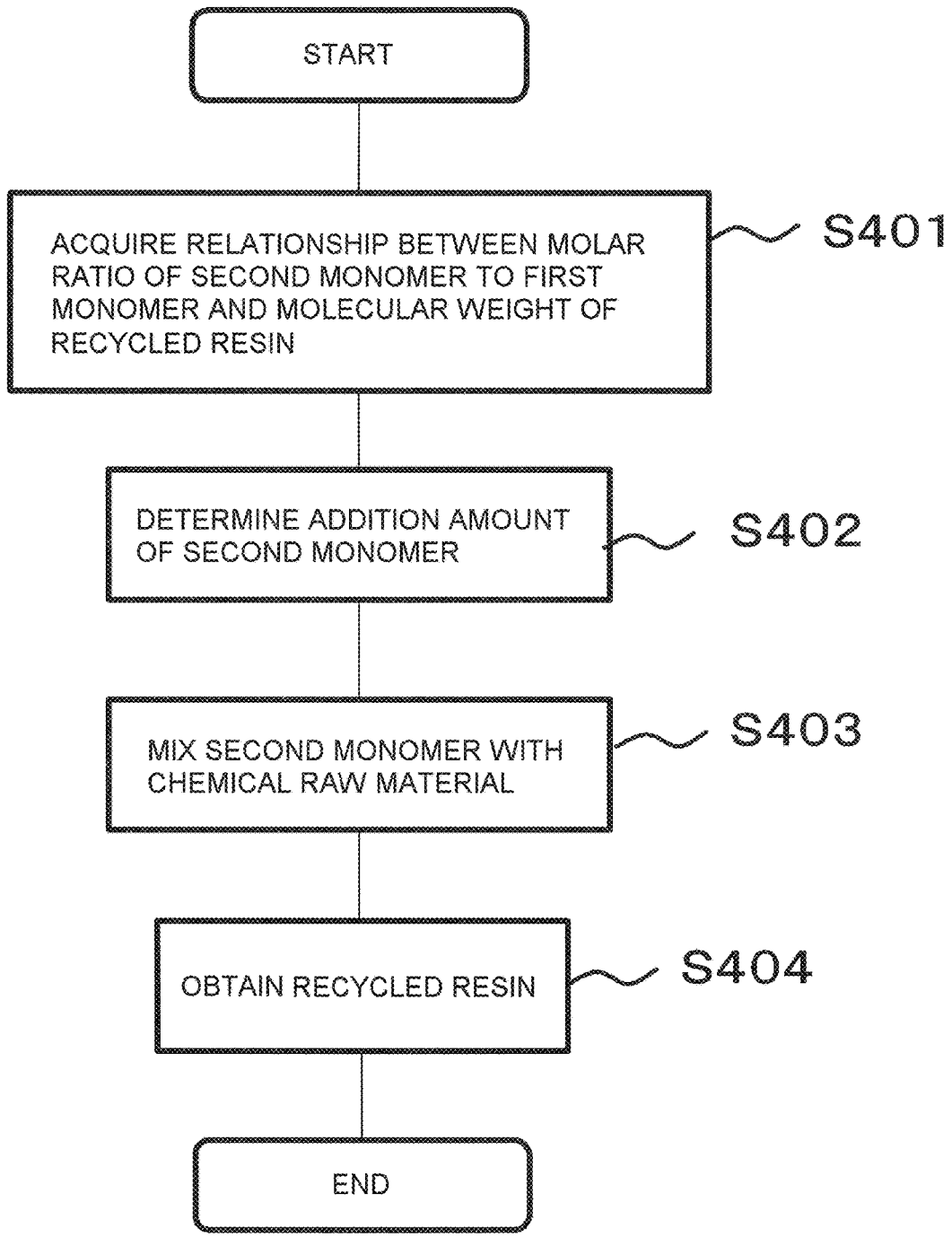

[Fig. 8]
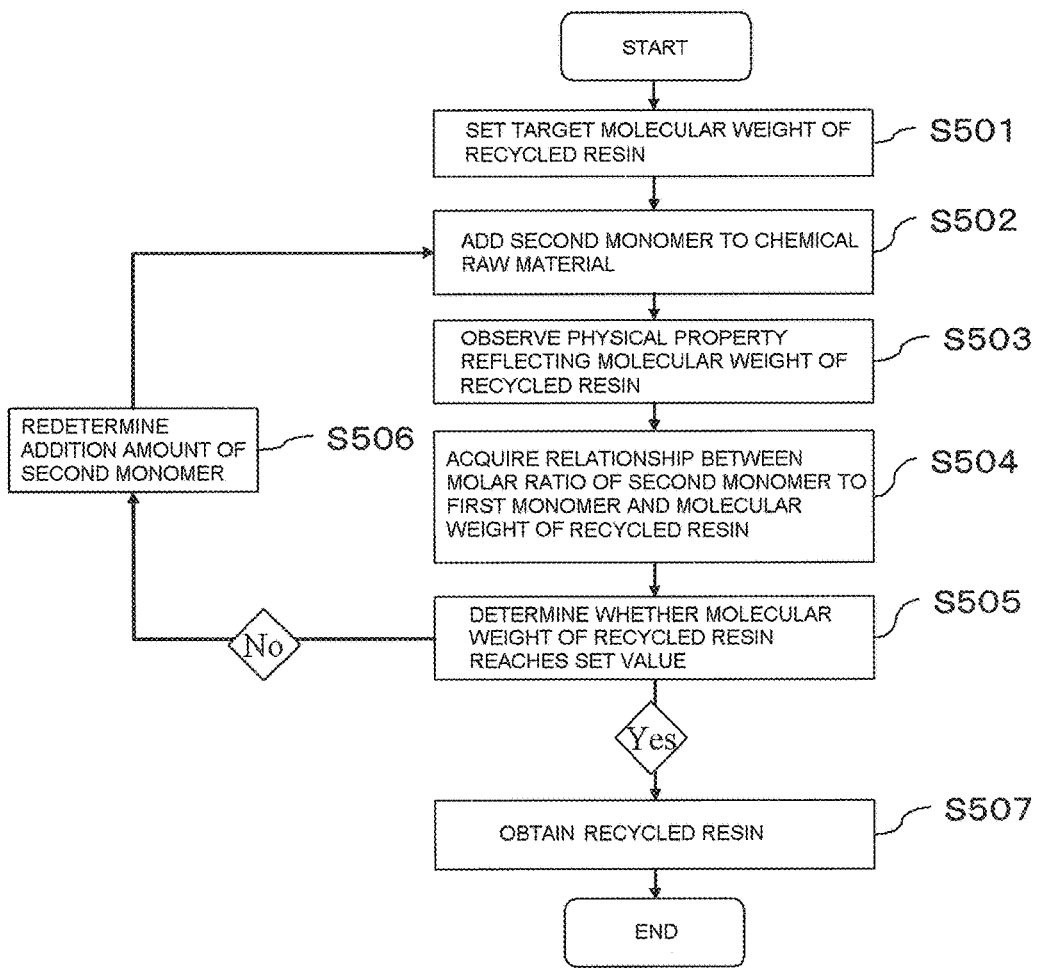

[Fig. 9]
(a)
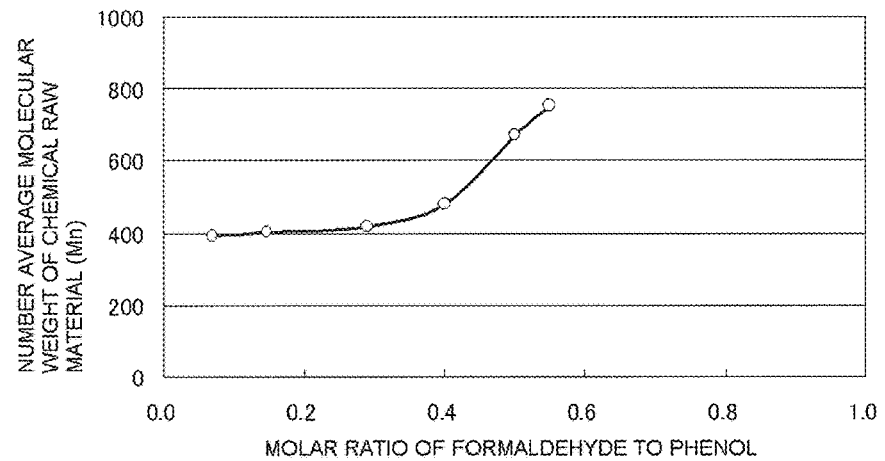
(b)
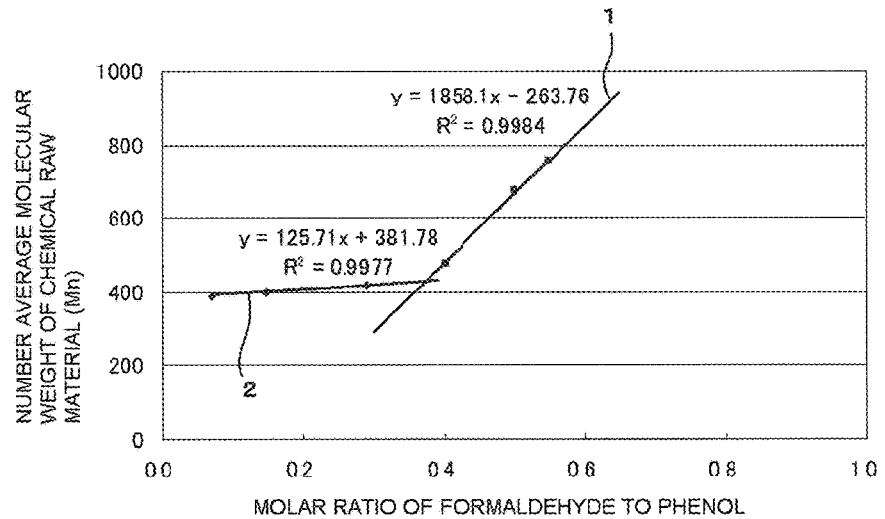

[Fig. 10]
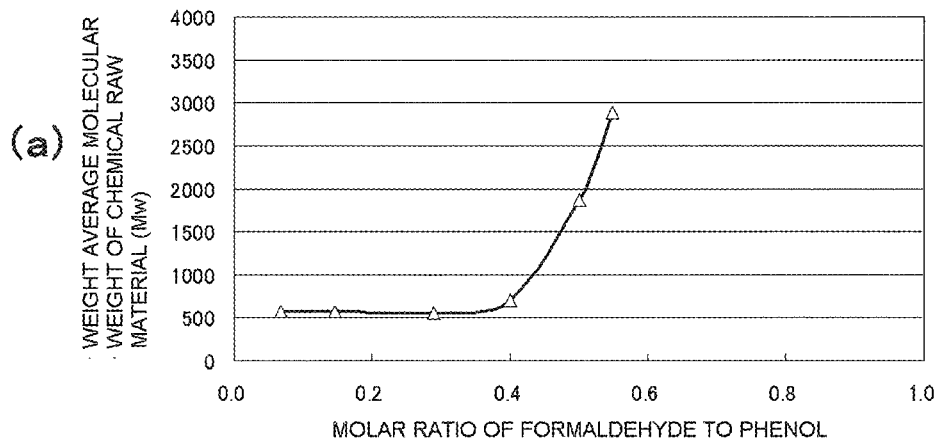
(a)
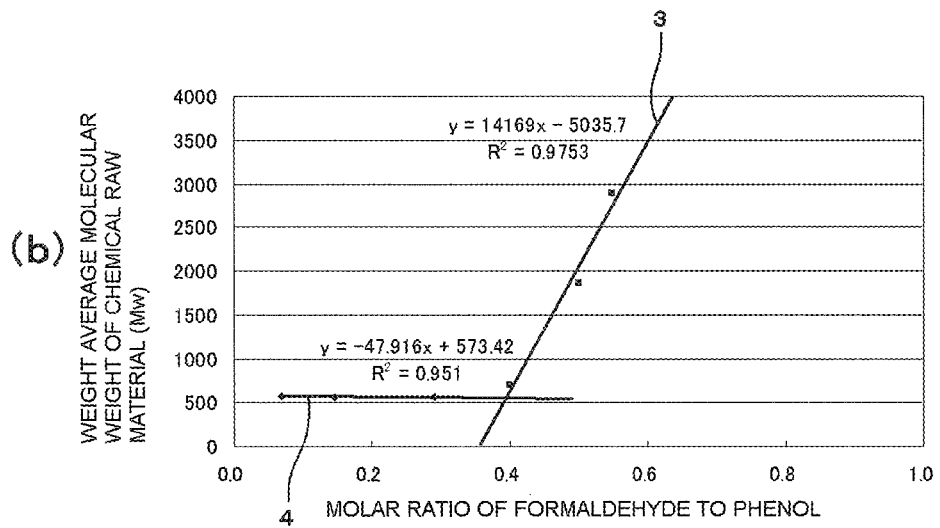
(b)

[Fig. 11]
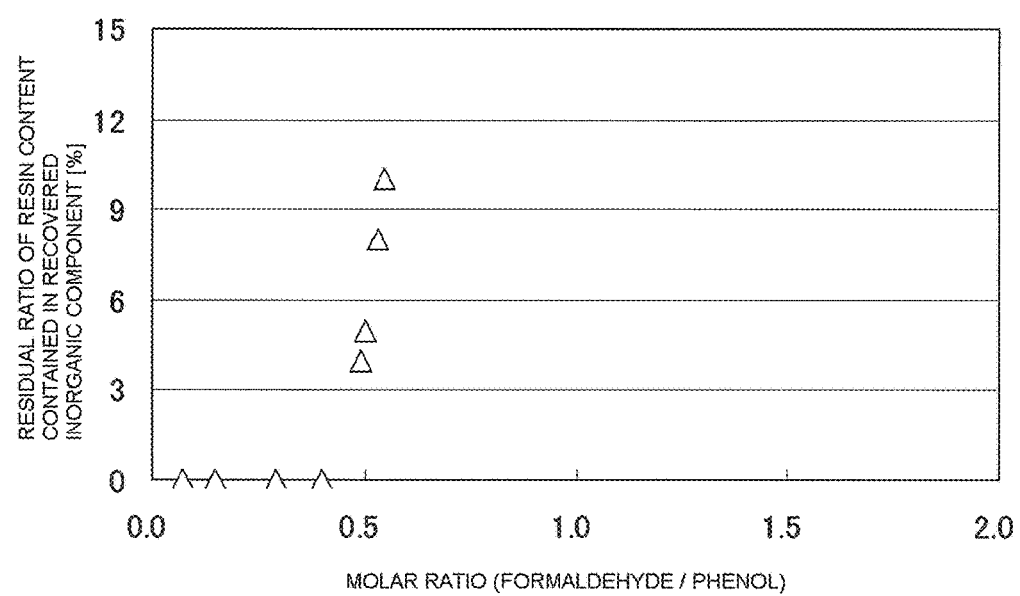

[Fig. 12]
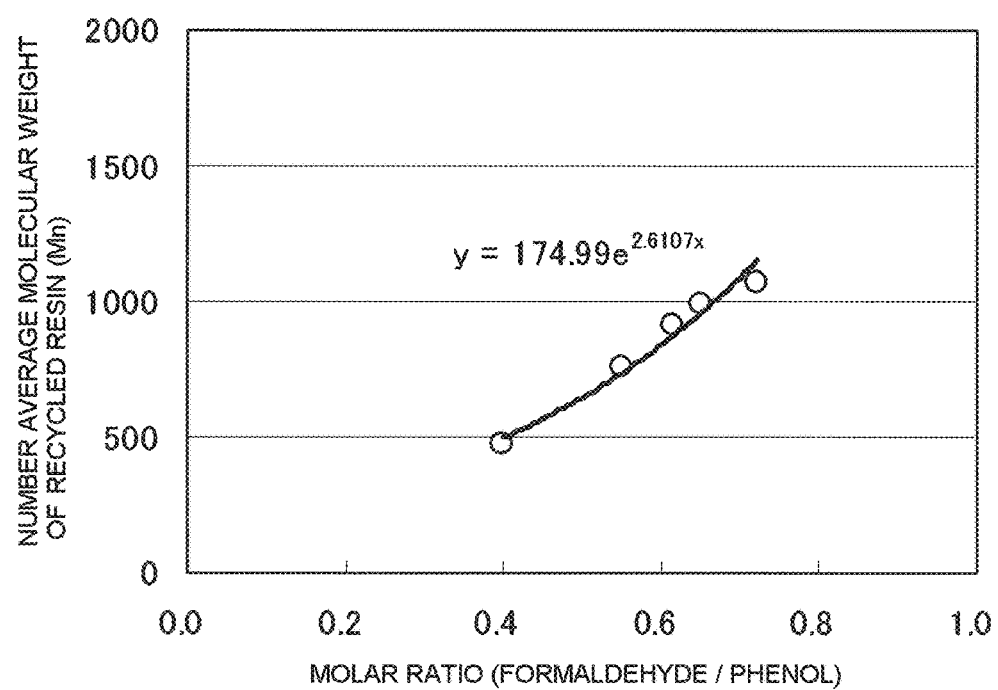

[Fig. 13]
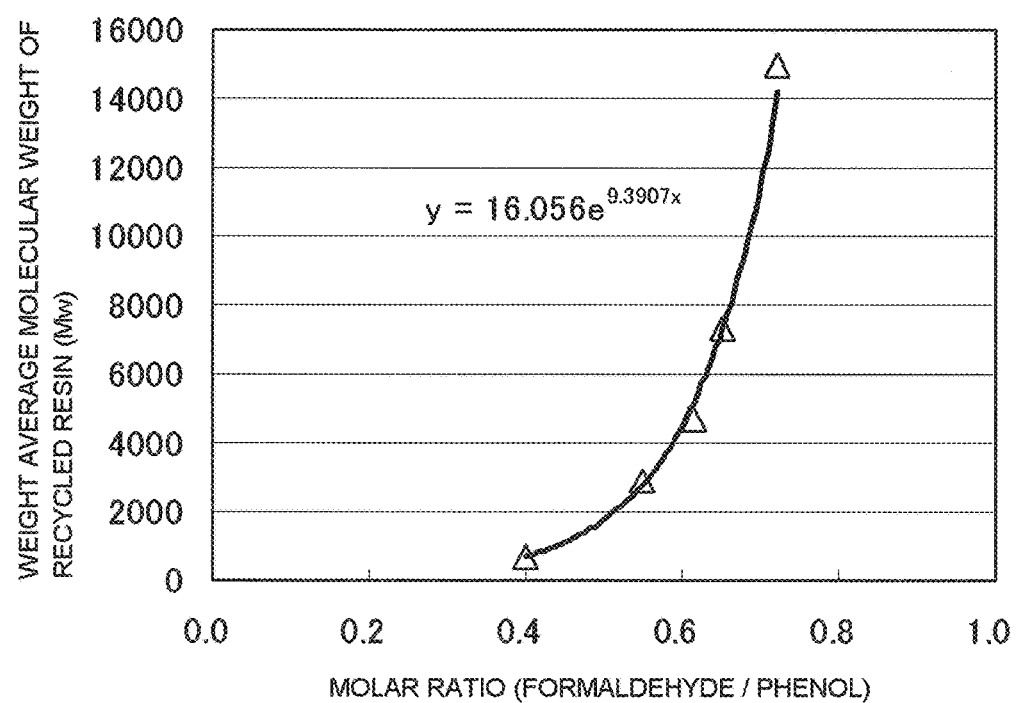

[Fig. 14]
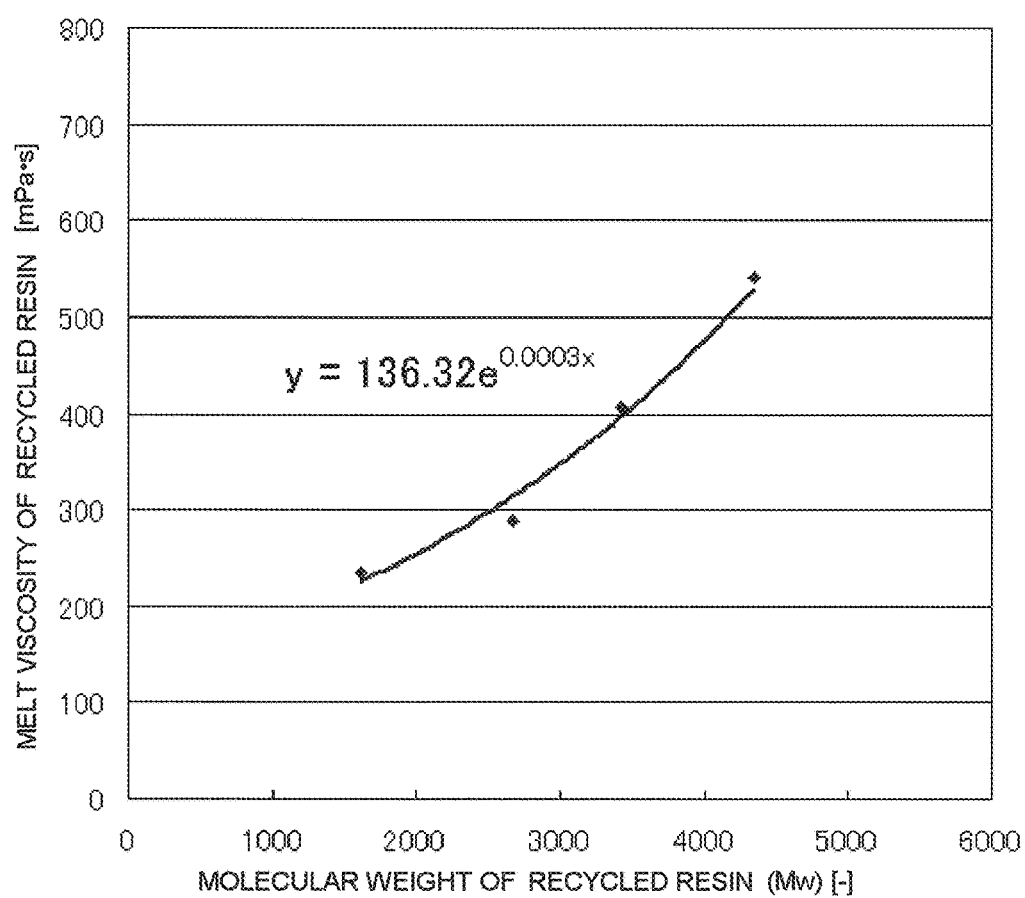

US 9,822,209 B2

METHOD FOR DECOMPOSING POLYMER MATERIAL, METHOD FOR PRODUCING RECYCLED RESIN, AND METHOD FOR RECOVERING INORGANIC FILLER

The present application is a Divisional of application Ser. No. 13/058,333, which is a National Stage Entry of PCT/JP2009/004464, filed on Sep. 9, 2009, which claims priority to JP 2008-330855, filed on Dec. 25, 2008 and JP 2008-234627, filed on Sep. 12, 2008, the entire contents of which are incorporated herein by reference.

TECHNICAL FIELD

The present invention relates to a method for decomposing a polymer material, a method for producing a recycled resin using a chemical raw material produced by using the same, a recycled resin obtained by the same, a recycled resin composition using the recycled resin, a method for recovering an inorganic filler, an inorganic filler obtained by the same, and a polymer material containing the same.

BACKGROUND ART

Among plastics, a thermosetting resin exhibits excellent electrical insulation, heat resistance and mechanical strength. Therefore, the thermosetting resin has been widely used as a material for electric and electronic parts, automobile parts or the like.

When a thermosetting resin is once cured, it is not dissolved in a solvent either without being softened and melted due to heat. Accordingly, it has been technically difficult to regenerate a valuable chemical raw material from a cured product thereof. However, the need of environmental preservation and building of a recycling based society has been reviewed these days, and various researches on recycling of thermosetting resins have been made.

In order to overcome these problems, Patent Document 1 discloses a technology in which, while a phenol resin is dissolved in phenol that is a constituent monomer of the resin to decompose to a low molecular compound such as phenol or the like, an organic filler is recovered.

Furthermore, Patent Document 2 discloses a technology in which alcohol in a supercritical state or subcritical state is brought into contact with a phenol resin to decompose to and recover phenol. Patent Document 2 further describes to the effect that a phenol resin may be produced through a reaction of the recovered phenol with formaldehyde.

However, according to the technologies of Patent Documents 1 and 2, the yield rate of the recycled thermosetting resin is not excellent.

In Patent Document 3, when the molecular weight distribution of an oligomer obtained by decomposing a thermosetting resin in a supercritical or subcritical state solvent becomes constant, recycle of the thermosetting resin has been carried out with the addition of a multi-functional compound. In this way, the quality of the recycled resin can be stabilized.

Furthermore, there has also been known a technology for improving the decomposition efficiency of the aforementioned thermosetting resin. In Patent Document 4, there has been disclosed a technology for mixing a thermosetting resin with a dispersing agent comprising a reaction solvent and a phenol resin to obtain a slurry. Accordingly, there has been disclosed that the stable high decomposition rate may be achieved by suppressing aggregation and sedimentation of a solid content in a high concentration slurry.

Furthermore, Patent Document 5 discloses that a phenol resin molding material having excellent mechanical strength is obtained with the use of a decomposed residue by adding a step of adjusting the decomposed residue containing an inorganic filler of the aforementioned thermosetting resin to a specific range.

RELATED ART REFERENCES

Patent Literatures

Patent Document 1: Japanese Unexamined Patent Application Publication 2005-054138
Patent Document 2: Japanese Unexamined Patent Application Publication 2001-055468
Patent Document 3: WO 2007/032047
Patent Document 4: Japanese Unexamined Patent Application Publication 2003-253041
Patent Document 5: Japanese Unexamined Patent Application Publication 2006-233141

DISCLOSURE OF THE INVENTION

However, in the technology of Patent Document 3, it has not been clear to how much extent the constituent monomer of the resin is present in a reaction system to proceed with a target decomposition reaction of the thermosetting resin. Therefore, currently the constituent monomer has been used in an excess amount. Accordingly, it is expected that the decomposition reaction is carried out higher effectively by using the constituent monomer in an appropriate amount.

Furthermore, according to the technology of Patent Document 4, since the resin component of the thermosetting resin or the organic filler is surely decomposed, it is expected that the inorganic filler may be recovered at a high purity. However, according to the knowledge of the present inventors, even though a molding material is produced by using a recovered product of the inorganic filler containing the resin component undecomposed to some degree, a molding material having properties comparable to those of a virgin product may be obtained. Accordingly, if the residual ratio of the resin component is controlled, it is expected that the inorganic filler may be recovered according to the target specification. Further, if the decomposition rate is enhanced without using a dispersing agent as disclosed in the technology of Patent Document 4, the production process may be conducted more easily.

Also, in the technology of Patent Document 5, since there is a need of a process of adjusting the decomposed residue to a specific range, improvement of throughput has been in demand.

Furthermore, as described above, the decomposition reaction of a crosslinked polymer including a thermosetting resin has been used as a means of recycling a polymer material. Therefore, a resin having a stable quality may be highly effectively recycled by using a reagent in an appropriate amount, and it is expected that environmental load is reduced.

The present invention has been accomplished in view of the above circumstances, and a first object of the present invention is to enable to use monomers in an appropriate amount in a reaction system for the decomposition reaction of a polymer material.

Furthermore, a second object of the present invention is to produce a recycled resin using monomers in an appropriate amount in a reaction system with respect to a chemical raw material obtained from the decomposition reaction of a polymer material.

Furthermore, a third object of the present invention is to control the content of the resin component undecomposed in a method for recovering an inorganic filler from the polymer material.

The present inventors have repeatedly been dedicated to study on the decomposition reaction of a polymer material containing a resin component composed of a first monomer and a second monomer and as a result, have found that a proportion of number of molecules of the second monomer to number of molecules of the first monomer in a reaction system and the molecular weight of the chemical raw material produced in the decomposition reaction satisfy a specific relationship. Thus, the first invention has been completed.

Furthermore, the present inventors have repeatedly been dedicated to study on the method for producing a recycled resin from a decomposition product obtained by decomposing a polymer material containing a resin component composed of a first monomer and a second monomer and as a result, have found that the proportion of number of molecules of the second monomer to number of molecules of the first monomer in a reaction system and the physical property of the recycled resin satisfy a specific relationship. Thus, the second invention has been completed.

Also, the present inventors have repeatedly been dedicated to study on the decomposition reaction of a polymer material containing a resin component composed of a first monomer and a second monomer and as a result, have found that the proportion of number of molecules of the second monomer to number of molecules of the first monomer in a reaction system and the residual ratio of the resin component undecomposed contained in the recovered inorganic filler satisfy a specific relationship. Thus, the third invention has been completed.

That is, the first invention provides a method for decomposing a polymer material by chemically decomposing a resin component composed of a first monomer and a second monomer in a mixture of a polymer material containing said resin component with said first monomer or a derivative of said first monomer to produce a chemical raw material to be a raw material for recycling said polymer material, comprising:

acquiring a relationship in advance between a proportion of number of molecules of said second monomer to number of molecules of said first monomer in a reaction system for decomposing said resin component and a molecular weight of said chemical raw material produced in said reaction system;

determining an addition amount of said first monomer or the derivative of said first monomer to be added to said polymer material based on said relationship; and mixing said first monomer or the derivative of said first monomer in said addition amount determined with said polymer material.

Furthermore, the first invention provides a recycled resin composition produced by using the chemical raw material obtained by the above method for decomposing a polymer material.

The first invention also provides a method for producing a recycled resin in which the recycled resin is produced with the addition of a multi-functional compound to said chemical raw material obtained by the above method for decomposing a polymer material.

The first invention also provides a recycled resin obtained by the above method for producing a recycled resin.

The first invention also provides a recycled resin composition using the recycled resin obtained by the above method for producing a recycled resin.

According to the first invention, a relationship between the proportion of the number of molecules of the second monomer to the number of molecules of the first monomer in a reaction system and the molecular weight of the chemical raw material produced in the reaction system is previously acquired in advance, whereby the amount of the first monomer to be added to the polymer material is determined based on the acquired relationship, and then the first monomer in an appropriate amount is mixed with the polymer material in order to obtain a desired chemical raw material. In this way, the polymer material may be decomposed by using the first monomer of a requisite minimum amount. Accordingly, decomposition of the polymer material may be high effectively carried out, and the environmental load can be reduced.

Furthermore, in the first invention, decomposition processing of the polymer material may be carried out with the addition of the derivative of the first monomer to the polymer material containing a resin component composed of a first monomer and a second monomer. The term "derivative of the first monomer" refers to those obtained by changing a substituent other than an active group of the first monomer. However, when two or more active groups are present, those obtained by substituting an active group may be included. The term "active group of the first monomer" refers to a functional group to be a reactive point reactive with the second monomer among functional groups of the first monomer.

Furthermore, according to the first invention, at determining the addition amount of the first monomer, the above proportion corresponding to the molecular weight of the desired chemical raw material may be selected from the acquired relationship, and the addition amount of the first monomer may be determined so as to have the selected proportion of the number of molecules of the second monomer to the number of molecules of the first monomer in a reaction system within the predetermined range.

The second invention provides a method for producing a recycled resin by chemically decomposing a resin component composed of a first monomer and a second monomer in a mixture of a polymer material containing said resin component with said first monomer or a derivative of said first monomer, and mixing said resin component decomposed with said second monomer or the derivative of said second monomer to produce a recycled resin, comprising:

acquiring a relationship in advance between a proportion of number of molecules of said second monomer to number of molecules of said first monomer in a reaction system for producing said recycled resin from said resin component decomposed and a physical property of said recycled resin;

determining an addition amount of said second monomer or the derivative of said second monomer to be added to said resin component decomposed based on said relationship; and mixing said second monomer or the derivative of said second monomer in said addition amount determined with said resin component decomposed.

According to the second invention, a relationship between the proportion of the number of molecules of the second monomer to the number of molecules of the first monomer in a reaction system and the physical property of the recycled resin produced in the reaction system is acquired in advance, whereby the addition amount of the second monomer to be added to a decomposition product of the resin component composed of a first monomer and a second monomer is determined based on the acquired relationship, and then the second monomer in an appropriate amount is mixed with the decomposed resin component in order to obtain a recycled resin having physical property to be desired. In this way, the recycled resin may be produced by mixing the second monomer of a requisite minimum amount with the decomposed resin component. Accordingly, the yield rate of the recycled resin may be improved and the environmental load may be reduced.

The second invention provides a method for producing a recycled resin by chemically decomposing a resin component composed of a first monomer and a second monomer in a mixture of a polymer material containing said resin component with said first monomer or a derivative of said first monomer, and mixing said resin component decomposed with said second monomer or the derivative of said second monomer to produce a recycled resin, comprising:

adding said second monomer to a reaction system for producing said recycled resin from said resin component decomposed;

observing a physical property reflecting a molecular weight of said recycled resin produced in said reaction system;

determining an addition amount of said second monomer or the derivative of said second monomer to be added to said resin component decomposed based on a relationship between a proportion of number of molecules of said second monomer to number of molecules of said first monomer in said reaction system and said physical property; and mixing said second monomer or the derivative of said second monomer in said addition amount determined with said resin component decomposed.

The second invention also provides a recycled resin obtained by the above method for producing a recycled resin.

The second invention also provides a recycled resin composition produced by using the above recycled resin.

According to the second invention, the physical property reflecting the molecular weight of the recycled resin produced in the reaction system are observed with the addition of the second monomer to the reaction system for producing a recycled resin from the decomposed resin component, and the addition amount of the second monomer to be added to the decomposed resin component is determined based on the relationship between the proportion of the number of molecules of the second monomer to the number of molecules of the first monomer in the reaction system and the physical properties. In this way, the recycled resin may be produced by using the second monomer of a requisite minimum amount. Accordingly, the yield rate of the recycled resin may be improved and the environmental load may be reduced.

Incidentally, in the second invention, the recycled resin may be produced with the addition of the derivative of the second monomer to the decomposed resin component. The term "derivative of the second monomer" refers to those obtained by changing a substituent other than an active group of the second monomer. However, when two or more active groups are present, those obtained by substituting an active group may be included. The term "active group of the second monomer" refers to a functional group to be a reactive point reactive with the first monomer among functional groups of the second monomer.

In the second invention, at determining the addition amount of the second monomer to be added, the above proportion corresponding to the physical property of the desired recycled resin may be selected from the acquired relationship, and the addition amount of the second monomer may be determined so as to have the selected proportion of the number of molecules of the second monomer to the number of molecules of the first monomer in a reaction system within the predetermined range.

Meanwhile, the third invention provides a method for recovering an inorganic filler, comprising:

chemically decomposing a resin component composed of a first monomer and a second monomer in a mixture of a polymer material containing said resin component and an inorganic filler with said first monomer or a derivative of said first monomer;

removing said resin component decomposed from a mixture of said polymer material with said first monomer or the derivative of said first monomer to calculate the residual ratio of said resin component undecomposed;

acquiring a relationship in advance between a proportion of number of molecules of said second monomer to number of molecules of said first monomer in a reaction system for decomposing said resin component and said residual ratio calculated;

determining an addition amount of said first monomer or the derivative of said first monomer to be added to said polymer material based on said relationship;

mixing said first monomer or the derivative of said first monomer in said addition amount determined with said polymer material; and removing said resin component decomposed from the mixture of said polymer material with said first monomer or the derivative of said first monomer to recover said inorganic filler.

The third invention also provides an inorganic filler recovered by using the above method for recovering an inorganic filler.

The third invention further provides a polymer material containing the above inorganic filler.

According to the third invention, a relationship between the proportion of the number of molecules of the second monomer to the number of molecules of the first monomer in a reaction system and the residual ratio of the polymer material is acquired in advance, whereby the addition amount of the first monomer to be added to the polymer material is determined based on the acquired relationship, and the decomposition efficiency of the polymer material may be controlled. Accordingly, the inorganic filler containing the resin component undecomposed in a desired range to such a degree that can be recycled may be recovered and the environmental load can be reduced.

Furthermore, according to the third invention, at determining the addition amount of the first monomer, the above proportion corresponding to the desired residual ratio may be selected from the acquired relationship, and the addition amount of the first monomer may be determined so as to have the selected proportion of the number of molecules of the second monomer to the number of molecules of the first monomer in a reaction system within the predetermined range.

Incidentally, in the present invention, the term "polymer material" refers to a resin composition containing at least any one of a thermoplastic resin and/or a thermosetting resin, and a product using the resin composition. The resin composition may be a composite material containing a filler, an additive or the like.

The polymer material is not particularly limited, and examples thereof include molding materials or encapsulating materials containing a thermosetting resin composition and an inorganic filler, laminate boards produced by impregnating the thermosetting resin composition in an inorganic base material or an organic base material, metal laminate boards obtained by adhering a metal foil, thermosetting resin products and the like.

In the present invention, decomposition processing of the polymer material may be chemical decomposition processing of a polymer material, or may comprise chemical decomposition processing of a polymer material. Further, it may be solubilizing treatment of a polymer material, or may comprise solubilizing treatment.

According to the present invention, using a reagent in an appropriate amount for decomposition processing of a polymer material, decomposition processing of a polymer material may be high effectively carried out and the environmental load may be reduced.

According to the second invention, the second monomer in an appropriate amount is added to the chemical decomposition product of the resin component composed of a first monomer and a second monomer, whereby the yield rate is improved and the environmental load is reduced. Therefore, the recycled resin may be produced.

Furthermore, according to the third invention, the decomposition efficiency of the resin component contained in the polymer material may be easily controlled, and the inorganic filler containing the resin component undecomposed in a desired range may be recovered.

BRIEF DESCRIPTION OF THE DRAWINGS

The above and other objects, features and advantages will be apparent from the following detailed description of the preferred embodiments in conjunction with the accompanying drawings.

FIG. 1 is a flow chart illustrating a decomposition method according to an embodiment.

FIG. 2 is a flow chart illustrating a method for producing a recycled resin according to an embodiment.

FIG. 3 is a schematic diagram illustrating a decomposition reaction according to an embodiment.

FIG. 4 is a view illustrating a relationship between the proportion of the number of molecules of the second monomer to the number of molecules of the first monomer in a reaction system for decomposing a polymer material and the molecular weight of a chemical raw material produced in the reaction system according to an embodiment.

FIG. 5 is a flow chart illustrating a method for recovering an inorganic filler according to an embodiment.

FIG. 6 is a flow chart illustrating a process of obtaining a chemical raw material and an inorganic filler from a polymer material.

FIG. 7 is a flow chart illustrating a method for producing a recycled resin according to an embodiment.

FIG. 8 is a flow chart illustrating a modified example of a method for producing a recycled resin according to an embodiment.

FIG. 9 is a view illustrating the results of Example 1.
FIG. 10 is a view illustrating the results of Example 1.
FIG. 11 is a view illustrating the results of Example 2.
FIG. 12 is a view illustrating the results of Example 3.
FIG. 13 is a view illustrating the results of Example 3.
FIG. 14 is a view illustrating the results of Example 4.

DESCRIPTION OF EMBODIMENTS

Hereinafter, embodiments of the present invention will be described referring to the drawings. Incidentally, in all drawings, the same components are assigned the same reference numerals and appropriate explanations thereof will be omitted.

First Embodiment

This embodiment relates to a method for decomposing a polymer material by chemically decomposing a resin component in a mixture of the polymer material containing the first monomer and the second monomer with the first monomer or a derivative of the first monomer to produce a chemical raw material to be a raw material for recycling the polymer material. In the present invention, the term "chemical raw material" refers to a decomposition product of a resin component comprising monomers, oligomers or a mixture thereof.

FIG. 1 is a flow chart illustrating a method for decomposing a polymer material of the embodiment. As shown in FIG. 1, first, a relationship between a proportion of number of molecules (amount of substance) of the second monomer to number of molecules (amount of substance) of the first monomer in a reaction system for decomposing the resin component and a molecular weight of the chemical raw material produced in the reaction system is acquired in advance (S101). Subsequently, an addition amount of the first monomer to be added to the polymer material is determined based on the above relationship (S102). The first monomer in the addition amount determined is then mixed with the polymer material (S103). Thereafter, the first monomer is made into a supercritical state or subcritical state (S104). Accordingly, decomposition processing of the polymer material proceeds to obtain a chemical raw material (S105).

Hereinafter, the method for decomposing a polymer material of the embodiment will be described in detail.

FIG. 3 illustrates a schematic diagram of the reaction system for decomposing a polymer material. The resin component contained in the polymer material is composed of the first monomer (molecular weight: $\alpha$) and the second monomer (molecular weight: $\beta$) bonded by a chemical bond. When the first monomer or its derivative is added to this polymer material, the first monomer is reacted with the resin component. For example, as shown in FIG. 3(a), when 1 molecule of the first monomer is added to 1 molecule of the resin component having a molecular weight $(4\alpha+5\beta)$, the first monomer is added to the resin component so that 1 molecule of a chemical raw material having a molecular weight $(5\alpha+5\beta)$ is produced. In addition, as shown in FIG. 3(b), when 2 molecules of the first monomer are added to 1 molecule of the above resin component, the resin component is decomposed so that 2 molecules of a chemical raw material having a number average molecular weight $\{(6\alpha+5\beta)/2\}$ are produced. Furthermore, as shown in FIG. 3(c), when 4 molecules of the first monomer are added to 1 molecule of the above resin component, the resin component is decomposed so that 3 molecules of a chemical raw material having a number average molecular weight $\{(8\alpha+5\beta)/3\}$ are produced.

Then, in S101, the proportion of the number of molecules of the second monomer to the number of molecules of the first monomer in the reaction system is plotted on the transverse axis while the number average molecular weight (Mn) of the chemical raw material produced is plotted on the vertical axis. In this way, a graph as shown in FIG. 4 is acquired. When the proportion of the number of molecules of the second monomer to the number of molecules of the first monomer is not less than 1.0, an addition reaction for adding the first monomer to the polymer material proceeds, so that the molecular weight of the chemical raw material produced may not be controlled. However, when the proportion of the number of molecules of the second monomer to the number of molecules of the first monomer becomes less than 1.0, the decomposition reaction of the polymer material proceeds. At this time, when the proportion of the number of molecules of the second monomer to the number of molecules of the first monomer is in a specified range, this proportion and the molecular weight of the chemical raw material produced are approximately proportional to each other. When the proportion of the number of molecules of the second monomer to the number of molecules of the first monomer reaches a predetermined value, the number average molecular weight of the chemical raw material produced becomes constant as well.

Incidentally, the weight average molecular weight (Mw) may be plotted on the vertical axis in place of the number average molecular weight (Mn) of the chemical raw material produced.

Subsequently, in S102, the amount of the first monomer to be added is determined based on the graph illustrated in FIG. 4. Specifically, a mechanism of the decomposition reaction is predicted from the proportion of the number of molecules of the second monomer to the number of molecules of the first monomer of the polymer material, and the range of the target molecular weight is determined in advance. The range of the proportion of the number of molecules of the second monomer to the number of molecules of the first monomer is determined, and according to the determined range, the addition amount of the first monomer added is determined.

Incidentally, in S101, the molecular weight of the chemical raw material corresponding to arbitrary two points may be examined in the ranges in which the proportion of the number of molecules of the second monomer to the number of molecules of the first monomer in the reaction system is in the range of less than 1.0. At this time, in S102, the addition amount of the first monomer is determined from the above proportion and the molecular weight of the chemical raw material supplementing the obtained two points.

The first monomer in the amount determined in S102 is added and mixed to the polymer material (S103). Thereafter, the first monomer is made into a supercritical state or subcritical state (S104). At this time, a reaction solvent may be added together with the first monomer.

Here, in the present invention, the term "supercritical state" refers to a state in which both temperature and pressure are higher than the critical point (critical temperature, critical pressure) of the first monomer or the reaction solvent. In the supercritical state, the first monomer dissolves a substance easily, thus exhibiting great diffusion rate, and has both properties of a liquid and a gas. The term "subcritical state" refers to a region in the vicinity of the critical point in which both temperature and pressure are a little lower than the critical point or a region in the vicinity of the critical point in which any one of temperature or pressure is a little lower than the critical point.

Next, the range of the temperature and pressure in the supercritical state or the subcritical state of the first monomer or the reaction solvent in the present invention will be described. The critical temperature of the first monomer is taken as Tc [K], while the critical pressure thereof is taken as Pc [MPa]. The reduction temperature obtained by dividing a temperature of T [K] by the critical temperature is taken as $Tr(=T/Tc)$, while the reduction pressure obtained by dividing a pressure of P [MPa] by the critical temperature is taken as $Pr(=P/Pc)$.

In the present invention, the term "supercritical state or subcritical state" specifically refers to a state of the temperature (T) and pressure (P) in which the mixture of the polymer material with the first monomer is in the range of $0.7 \leq Tr \leq 1.3$ and $0.3 \leq Pr \leq 6.0$, and preferably in the range of $0.8 \leq Tr \leq 1.2$ and $0.4 \leq Pr \leq 4.0$. In the present invention, in the above range of the temperature (T) and pressure (P), $1.0 \leq Tr$ and $1.0 \leq Pr$ are defined as the supercritical state, and the other range is defined as the subcritical state.

Hereinafter, the range of the specific temperature and pressure will be exemplified. When the first monomer is phenol, the critical temperature of phenol is 694 K (421° C.) and the critical pressure is 6.1 MPa. So, the term "supercritical state or subcritical state" refers to a state in which the temperature is in the range of 486 K (213° C.) or more and 902 K (629° C.) or less, and the pressure is in the range of 1.8 MPa or more and 36.6 MPa or less. Preferably, the temperature is in the range of 555 K (282° C.) or more and 833 K (560° C.) or less, and the pressure is in the range of 2.4 MPa or more and 24.4 MPa or less.

When methanol is used as a reaction solvent, the critical temperature of methanol is 513 K (240° C.) and the critical pressure is 8.1 MPa. So, the term "supercritical state or subcritical state" refers to a state in which the temperature is in the range of 359 K (86° C.) or more and 667 K (394° C.) or less, and the pressure is in the range of 2.4 MPa or more and 48.6 MPa or less. Preferably, the temperature is in the range of 410 K (137° C.) or more and 616 K (343° C.) or less, and the pressure is in the range of 3.2 MPa or more and 32.4 MPa or less.

When water is used as a reaction solvent, the critical temperature of water is 648 K (374° C.) and the critical pressure is 22.1 MPa. So, the term "supercritical state or subcritical state" refers to a state in which the temperature is in the range of 453 K (180° C.) or more and 841 K (568° C.) or less, and the pressure is in the range of 6.6 MPa or more and 132.6 MPa or less. Preferably, the temperature is in the range of 518 K (245° C.) or more and 776 K (503° C.) or less, and the pressure is in the range of 8.8 MPa or more and 88.4 MPa or less.

As described above, the first monomer or the reaction solvent and a mixture thereof are made into a supercritical state or subcritical state, whereby decomposition processing of the polymer material proceeds and a predetermined post treatment is carried out to recover a product containing the chemical raw material.

The polymer material may be recycled from the chemical raw material contained in the thus-obtained recovered product.

According to the embodiment, the derivative of the first monomer in place of the first monomer may be added to the polymer material to obtain a chemical raw material. A resin different from the polymer material decomposed by using the thus-obtained chemical raw material may be produced.

The polymer compound produced from the chemical raw material obtained in the embodiment is hereinafter referred to as a recycled resin.

FIG. 2 illustrates a flow chart explaining a method for producing a recycled resin using the decomposition processing of the embodiment.

First, in S201, decomposition processing of the polymer material in the embodiment as shown in FIG. 1 is carried out to obtain a chemical raw material. Then, in S202, a recycled resin is produced from the chemical raw material obtained in S201.

Specifically, in S202, a multi-functional compound is added to the chemical raw material produced in S201. As the multi-functional compound, there may be used a second monomer or a derivative of the second monomer.

Hereinafter, the decomposition reaction of the polymer material to be carried out in the embodiment will be described in more detail.

For the decomposition reaction of the polymer material to be carried out in the embodiment, the chemical raw material is obtained by conducting decomposition and/or solubilization of the polymer material in a supercritical state or subcritical solvent having a first monomer as an essential component in a heating and pressurizing vessel.

(a) Polymer Material

In the embodiment, the polymer material to be decomposed is composed of a first monomer and a second monomer. Specifically, a straight chain polymer and/or a crosslinked polymer are used for the polymer material. The straight chain polymer is selected from a thermoplastic resin such as polyethylene terephthalate, polybutylene terephthalate, polyphenylene sulfide, nylon 66 and the like, while the crosslinked polymer is selected from the group consisting of a thermosetting resin, a photocurable resin and a radical-curable resin.

The thermosetting resin to be applied to the embodiment is not particularly limited. A phenol resin, an epoxy resin, a melamine resin and a urea resin may be particularly effectively applied. Furthermore, more preferably used are those containing a phenol resin.

Examples of such a phenol resin include novolac type phenol resins such as a phenol novolac resin, a cresol novolac resin, a bisphenol A novolac resin and the like; and resol type phenol resins such as an unmodified resol phenol resin, and an oil-modified resol phenol resin modified by paulownia oil, linseed oil, walnut oil or the like.

(b) First Monomer

Examples of the first monomer used in the embodiment include a phenol compound, urea, a melamine compound, and derivatives of the monomers.

As such a first monomer, for example, a phenol compound in which at least one of hydrogen atoms bonded to a carbon atom of an aromatic ring is substituted by a hydroxyl group may be selected. This phenol compound functions as a solvent as a single solvent or a mixture with other solvent in supercritical or subcritical state and is capable of decomposing and/or solubilizing the polymer material. Examples of the phenol compound include phenol; cresols such as o-cresol, m-cresol, p-cresol and the like; xylenols such as 2,3-xylenol, 2,4-xylenol, 2,5-xylenol, 2,6-xylenol, 3,4-xylenol, 3,5-xylenol and the like; trimethylphenols such as 2,3,5-trimethylphenol and the like; ethylphenols such as o-ethylphenol, m-ethylphenol, p-ethylphenol and the like; alkylphenols such as isopropylphenol, butylphenol, t-butylphenol and the like; o-phenylphenol; m-phenylphenol; p-phenylphenol; catechol; naphthalenediols such as 1,5-dihydroxynaphthalene, 1,6-dihydroxynaphthalene, 2,7-dihydroxynaphthalene and the like; polyhydric phenols such as resorcin, catechol, hydroquinone, pyrogallol, phloroglucin and the like; and alkyl polyhydric phenols such as alkylresorcin, alkylcatechol, alkylhydroquinone and the like. Among these, preferably used are phenols from the viewpoints of the cost and an effect imparting to the decomposition reaction.

Alternatively, as the first monomer, melamine compounds may be selected. As the melamine compound, melamine or a compound such as acetoguanamine and benzoguanamine in which an amino group of melamine is substituted by other functional group is suitably used.

As the first monomer, one kind or a combination of two or more kinds thereof may be used.

(c) Second Monomer

As the second monomer constituting the polymer material used in the embodiment, a multi-functional compound is used. Examples of the multi-functional compound include aldehyde compounds, of which a formaldehyde compound is suitably used. Examples of the formaldehyde compound include formaldehyde, paraformaldehyde, trioxane, acetaldehyde, propionaldehyde, polyoxymethylene, chloral, hexamethylenetetramine, fulfral, glyoxal, n-butylaldehyde, caproaldehyde, allylaldehyde, benzaldehyde, crotonaldehyde, acrolein, tetraoxymethylene, phenylacetaldehyde, o-tolualdehyde, salicylaldehyde, dihydroxybenzaldehyde, trihydroxybenzaldehyde, 4-hydroxy-3-methoxyaldehyde paraformaldehyde and the like.

As the second monomer, one kind or a combination of two or more kinds thereof may be used.

(d) Processing Conditions

The decomposition processing conditions of the polymer material may well render a solvent having a first monomer as an essential component in a supercritical state or subcritical state, and this may be achieved by controlling mainly a temperature and pressure. Besides, a decomposition processing apparatus may be any type capable of conducting these processing conditions, and may be any of batch type, semi-batch type or continuous type.

The polymer material may contain a cured resin, an uncured or half-cured resin, a varnish containing these resins or the like.

The polymer material is not particularly limited, and examples thereof include encapsulating materials comprising a thermosetting resin composition containing an epoxy resin, a phenol resin, a polyimide resin, a benzocyclobutene resin or the like, and an inorganic filler such as silica or the like. Furthermore, laminate boards produced by impregnating in an inorganic base material such as a glass nonwoven fabric or an organic base material such as paper and cloth, metal-clad laminate boards obtained by adhering a metal foil such as a copper foil or the like, and thermosetting resin products such as printed circuit boards obtained by processing the copper-clad laminate boards may be used as the polymer material.

Furthermore, other examples of the polymer material include molding materials using a thermosetting resin composition, and thermosetting resin products such as a foam material, a friction material, a cast metal, an adhesive, a refractory material, whetstone or the like. The term "thermosetting resin composition" refers to, for example, those obtained by combining an inorganic filler such as silica, calcium carbonate, aluminum hydroxide, glass fiber or the like, an organic filler such as wood powder or the like, a rubber ingredient, or other additive with a thermosetting resin such as a novolac type phenol resin, a resol type phenol resin, an alkyl-modified phenol resin, a phenoxy-modified phenol resin, a phenol resin modified by oil such as cashew or the like, a melamine resin, a urea resin or the like.

When the polymer material to be provided for the processing is a solid form, the shape and size thereof are not particularly restricted. The solid polymer material may be pulverized to an appropriate size considering necessary cost for pulverization and the decomposition rate. Usually, a particle diameter is not more than 1,000 μm, preferably not more than 500 μm, and further preferably not more than 250 μm. Within the range of the aforementioned particle diameter, a decomposition processing step may be conducted in a short time and is effective. On the other hand, when the particle diameter is less than the aforementioned lower limit, in the pulverization step before the decomposition processing step, an enormous increase of cost involved in pulverization is resulted in some cases. Even for pulverization to less than the above lower limit, in the subsequent decomposition processing step, the decomposition efficiency does not become excellent. When it is greater than the aforementioned upper limit, the decomposition efficiency in relation to the specific surface area is worsened, and depending on the circumstances, the polymer material may not be precipitated and decomposed in some cases. Accordingly, in the aforementioned range of the particle diameter, a particle diameter for balancing both of the decomposition processing step and pulverization step may be selected.

The first monomer may contain one obtained when the polymer material of the embodiment is subjected to decomposition, followed by separating and purifying.

Meanwhile, the first monomer may be used in combination with other solvent. As other solvent, all that are used as a solvent in an ordinary chemical reaction such as water, alcohols such as methanol and ethanol, glycols such as ethylene glycol and propylene glycol, ketones, ethers, esters, organic acids and acid anhydrides may be used. Furthermore, a plurality of solvents may be used. Among the solvents, from the viewpoints of an effect imparting to the decomposition reaction and easy availability, water is preferred. Furthermore, the mixing ratio of the other solvent to the constituent monomers is preferably from 1 to 500 parts by weight and more preferably from 5 to 50 parts by weight, based on 100 parts by weight of the first monomer.

As the temperature, the reduction temperature (Tr) is usually preferably in the range of $0.7 \leq Tr \leq 1.3$, and more preferably in the range of $0.8 \leq Tr \leq 1.2$. When the temperature is too low, the decomposition rate of the polymer material may be lowered and processing in a short time may be difficult in some cases. When the temperature is, on the contrary, too high, side reactions such as a pyrolysis reaction and a dehydration reaction may be accompanied to vary a chemical structure of the chemical raw material, so that the reuse of the chemical raw material may be difficult in some cases. That is, when the temperature is set in the above range, the method is excellent in a balance between maintenance of the high decomposition rate and suppression of the side reaction.

Furthermore, as the pressure, the reduction pressure (Pr) is usually preferably in the range of $0.3 \leq Pr \leq 6.0$, and more preferably in the range of $0.4 \leq Pr \leq 4.0$. When the pressure is too low, the first monomer does not become a supercritical state or subcritical state but becomes a vapor or gas state, so that the decomposition rate may be lowered in some cases. On the other hand, when the pressure is too high, a unit operable under more severe conditions may be necessary, energy necessary for maintaining high pressure may be increased, the decomposition rate may be hardly improved, and an outstanding effect may not be obtained in some cases. When the pressure is set in the above range, the method is excellent in a balance between maintenance of the high decomposition rate and suppression of the energy consumption.

Furthermore, decomposition processing may be continued until the molecular weight distribution (Mw/Mn) of the chemical raw material reaches a specified value. The reaction time is from about 1 to 60 minutes, and preferably from about 3 to 30 minutes.

The method of the embodiment is preferable as a method for decomposing a polymer material to a chemical raw material having a molecular weight (Mw) of $2.0 \times 10^2$ or more and $2.5 \times 10^3$ or less. This molecular weight, in case of the phenol resin, corresponds to 2 to 25 nuclei. More preferably, the molecular weight may be in the range of $2.0 \times 10^2$ or more and $1.5 \times 10^3$ or less, and this molecular weight, in case of the phenol resin, corresponds to 2 to 15 nuclei. The term "molecular weight of the chemical raw material" mentioned herein means that the resin component contained in the chemical raw material has a molecular weight shown herein and is contained in an amount of not less than 50% by weight. The molecular weight distribution (Mw/Mn) of the chemical raw material upon completion of the processing is preferably in the range of 1.0 or more and 3.0 or less, and more preferably in the range of 1.0 or more and 2.0 or less. In the embodiment, since the chemical raw material having a specified molecular weight distribution is obtained, the quality of the recycled resin obtained in the next step becomes stable.

Incidentally, the molecular weight distribution (Mw/Mn) of the chemical raw material upon completion of the decomposition processing is suitably measured by the use of gel permeation chromatography (GPC). As specific examples of measurement units and conditions at that time, two of TSKgel GMHL and two of TSKgel G2000HL manufactured by Tosoh are used as a separation column, tetrahydrofuran is used as an eluent, a calibration curve is obtained in terms of polystyrene, a differential refractive index meter is used as a detector, a flow rate is set to 1 $cm^3$/min, and a temperature is set to 40° C.

The decomposition processing of the embodiment, from the viewpoint of improving the processing rate, is preferably carried out in the presence of a base catalyst. The base catalyst at that time is not particularly restricted, and examples thereof include a Broensted base, a Lewis base, or natural inorganic and organic compounds, and compounds showing an equivalent effect upon hydration with a metal oxide. One kind or a combination of two or more kinds thereof may be used.

Concrete examples of the base catalyst include inorganic compounds such as beryllium hydroxide, sodium hydroxide, magnesium hydroxide, potassium hydroxide, calcium hydroxide, strontium hydroxide, barium hydroxide, an oxide showing an equivalent effect upon hydration and the like; and organic compounds including amines such as pyridine and triethylamine, amidines such as acetamidine and benzylamidine, ammonium salts such as diazobicycloundecane, phosphonium salts such as tetrabutylphosphonium hydroxide, and the like.

The chemical raw material obtained by the decomposition method of the embodiment as described above is reacted with a multi-functional compound, whereby the recycled resin may be produced. At this time, as the chemical raw material, the recovered product after completion of the decomposition processing step (S201) may be used as it is. As the multi-functional compound, a second monomer or a derivative of the second monomer may be used.

The recycled resin may be obtained, for example, in a known method illustrated in Patent Document 3. As for a typical example of a chemical structure of the recycled resin, when a phenol resin is used as a polymer material, there is exemplified a novolac type phenol resin where nuclei of a phenol skeleton form a methylene bond. When the polymer material is a melamine resin, there is exemplified a melamine resin where nuclei of a melamine skeleton form a methylene bond. When the polymer material is a urea resin, there is exemplified a urea resin where nuclei of a urea skeleton form a methylene bond. When the polymer material is an epoxy resin, there is exemplified a compound having a structure where nuclei of a main skeleton of the epoxy resin form a methylene bond such as bisphenol A, bisphenol F, a phenol novolac resin, a cresol novolac resin or the like. Incidentally, when epichlorhydrine is further added to and reacted with the recycled resin obtained from the aforementioned epoxy resin, there is exemplified a compound having a structure where the recycled resin is epoxidized. Furthermore, when the thermosetting resin that is a raw material contains a phenol resin, a melamine resin, a urea resin or an epoxy resin, there are exemplified structures where the respective resins and respective nuclei of the phenol skeletons, melamine skeletons, urea skeletons or main skeletons of the epoxy resin are copolymerized through a methylene bond. However, the chemical structures are only one example and the obtained recycled resin usually has a polymer component having a molecular weight in the range of $2.0 \times 10^2$ to $1.0 \times 10^5$ as a main portion, and a molecular weight distribution (Mw/Mn) preferably in the range of 2.0 or more and 15 or less, and more preferably in the range of 3.0 or more and 10 or less. Herein, the term "molecular weight of the recycled resin component" refers to a weight average molecular weight (Mw).

The molecular weight in the range of $2.0 \times 10^2$ to $1.0 \times 10^5$ is substantially the same as that of a prepolymer used for the production of a polymer material, so that it may be reused as a prepolymer by carrying out purification as needed. Here, the term "polymer component having a molecular weight in the range of $2.0 \times 10^2$ to $1.0 \times 10^5$ as a main portion" means that a polymer component having a molecular weight shown herein is contained not less than 50% by weight. However, other than the polymer component having a molecular weight of the main portion, a polymer component having a molecular weight exceeding $1.0 \times 10^5$ may be contained as well. The polymer component having a molecular weight in the range of $2.0 \times 10^2$ to $1.0 \times 10^5$, in the case of the usual polymer material, corresponds to about 2.0 to $1.0 \times 10^3$ nuclei of raw material monomers. Furthermore, a compound that mainly has a polymer component having a molecular weight in the range of $20 \times 10^2$ to $1 \times 10^5$ contains not only a component obtained from a polymer material but also a component obtained from an organic filler or a base material contained in the polymer material in some cases.

Herein, the obtained recycled resin, after a solvent, a residue and the like are separated, may be reused as a raw material of the recycled resin composition. The method of separation is not particularly limited, and is used in a usual solid-liquid separation. Processes such as cyclone, filtration, gravitational sedimentation and the like are cited. Furthermore, the recycled resin mainly made of a polymer component having a molecular weight in the range of $2.0 \times 10^2$ to $1.0 \times 10^5$, and a mixture containing a processed and recovered product of the polymer material may be diluted in an organic solvent, and then a solid-liquid separation operation such as such as cyclone, filtration, gravitational sedimentation or the like may be conducted.

Furthermore, in the embodiment, unreacted first monomers are separated, and this is newly reused in the decomposition processing of the polymer material. Furthermore, the recycled resin mainly made of a polymer component having a molecular weight in the range of $20 \times 10^2$ to $1.0 \times 10^5$ is distilled or extracted to separate and recover first monomers which may be reused. Herein, a method of separating unreacted first monomers is not particularly limited, and anyone of methods such as flash distillation, reduced-pressure distillation, solvent extraction and the like may be employed. Furthermore, according to the construction of the embodiment, first monomers of a requisite minimum amount may be introduced into the reaction system, so that the above reuse operation becomes simpler than in the past.

Furthermore, in the obtained recycled resin, the unreacted reaction reagent such as the first monomer, the second monomer, water or the like may be contained in a small amount, in addition to the above polymer component having a molecular weight in the range of $2.0 \times 10^2$ to $1.0 \times 10^5$.

Next, an operational effect of the embodiment will be described. According to the method in the embodiment, a relationship between the proportion of the number of molecules of the second monomer to the number of molecules of the first monomer in a reaction system and the molecular weight of the chemical raw material produced in the reaction system is acquired in advance, whereby the addition amount of the first monomer or the derivative of the first monomer to be added to the polymer material is determined based on the acquired relationship, and then the first monomer in an appropriate amount is mixed with the polymer material in order to obtain a desired chemical raw material. In this way, in the mixture of the first monomer of a requisite minimum amount the polymer material may be decomposed. Accordingly, decomposition processing of the polymer material may be highly effectively carried out and the environmental load can be reduced.

Furthermore, the polymer material may be recycled by using the chemical raw material obtained by the decomposition processing method of the embodiment. Furthermore, the derivative of the first monomer in S102 is added, or the derivative of the second monomer in S202 is used, whereby an arbitrary recycled resin may be produced. Accordingly, the recycled resin may be obtained without using a reagent in an excess amount, and it may be possible to provide a recycling means with much reduced load to the environment.

Second Embodiment

FIG. 5 is a flow chart illustrating a method for recovering an inorganic filler of the embodiment. The method for recovering an inorganic filler comprises chemically decomposing a resin component composed of a first monomer and a second monomer in a mixture of a polymer material containing the resin component and an inorganic filler with the first monomer or a derivative of the first monomer (S301);

removing the resin component decomposed from the mixture of the polymer material with the first monomer or the derivative of the first monomer to calculate a residual ratio of the resin component undecomposed (S302);

acquiring a relationship in advance between a proportion of number of molecules of the second monomer to number of molecules of the first monomer in a reaction system for decomposing the resin component and the residual ratio calculated (S303);

determining an addition amount of the first monomer to be added to the polymer material based on the above-stated relationship (S304);

mixing the first monomer in the addition amount determined with the polymer material (S305); and removing the resin component decomposed from the mixture of the polymer material with the first monomer to recover an inorganic filler (S306).

Hereinafter, the embodiment will be illustrated in detail using FIGS. 5 and 6. FIG. 6 is a flow chart illustrating a process of obtaining a chemical raw material and an inorganic filler from a polymer material.

[S301: Decomposition Processing of the Polymer Material]

First, a polymer material comprising a resin component composed of a first monomer and a second monomer and an inorganic filler is prepared. As the polymer material, those exemplified in the first embodiment may be used. Furthermore, as the first monomer and the second monomer, those explained in the first embodiment may be used.

In the embodiment, examples of the inorganic filler include oxide silicon such as silica, glass fiber, carbon fiber, calcium carbonate, glass beads, aluminum hydroxide, clay, calcined clay, talc, diatomaceous earth, alumina, magnesium oxide and magnesium hydroxide.

Subsequently, the resin component is chemically decomposed with the addition of the first monomer to the polymer material. At this time, the first monomer may be used in combination with other solvent. As other solvent, those exemplified in the first embodiment may be used.

Herein, the mixture of the first monomer in a mixture of the first monomer and the polymer material with other solvent is made into a supercritical state or subcritical state. In this way, the resin component may be decomposed in a short reaction time without addition of an acid catalyst or a base catalyst. However, for the purpose of the decomposition at a much lower reaction temperature in a much shorter reaction time, an acid catalyst or a base catalyst may be used. The temperature and pressure at this time may be the same as those in S104 explained in the first embodiment.

[S302: Evaluation of the Residual Ratio of the Resin Component Undecomposed]

After completion of the decomposition reaction, an arbitrary solvent is added to the decomposition product. The solvent used herein may be selected from those which dissolve the decomposed resin component and do not dissolve the resin component undecomposed and inorganic filler. Then, the product is filtered with a filter and the filtrate is a soluble content. Further, the residue remained in the filter after filtration is an insoluble content. A pore diameter of the filter may be good as long as the resin component undecomposed and inorganic filler remain, and it is preferably from 0.1 to 10 μm. Then, the insoluble content is subjected to an incineration treatment and weighed. The residual ratio may be determined according to Formula 1.

Residual ratio [%] of unreacted resin component contained in inorganic filler recovered product (1)=[{weight (g) of inorganic filler recovered product (1)−weight (g) of residue after incineration (2)}/weight (g) of inorganic filler recovered product (1)]×100    Formula 1

[S303: Acquisition of Data on a Relationship between the Molar Ratio of the Second Monomer to the First Monomer in a Reaction System and the Residual Ratio of the Resin Component Undecomposed]

In S303, the proportion of the number of molecules of the second monomers to the number of molecules of the first monomer in a reaction system is plotted on the transverse axis, and as a result of evaluation of S302, the obtained residual ratio is plotted on the vertical axis. As explained in the first embodiment, when the proportion of the number of molecules of the second monomer to the number of molecules of the first monomer becomes less than 1.0, the decomposition reaction of the polymer material proceeds. At this time, when the proportion of the number of molecules of the second monomer to the number of molecules of the first monomer is in the predetermined range, this proportion and the molecular weight of the chemical raw material produced are approximately proportional to each other. When the proportion of the number of molecules of the second monomer to the number of molecules of the first monomer reaches a certain predetermined value, the number average molecular weight and the weight average molecular weight of the chemical raw material produced become constant as well. The decomposition rate is defined as the proportion of the resin component contained in the polymer material decomposed to the chemical raw material. Therefore, according to this principle, when the proportion of the number of molecules of the second monomer to the number of molecules of the first monomer is in the predetermined range, this proportion and the decomposition rate of the resin component are approximately proportional to each other. When the proportion reaches a certain predetermined value, the decomposition rate reaches 100%. Furthermore, the residual ratio is theoretically defined as the content of the resin component undecomposed contained in the decomposition product. So, the proportion of the number of molecules of the second monomer to the number of molecules of the first monomer and the residual ratio are approximately proportional to each other. When the proportion reaches a certain predetermined value, the residual ratio reaches 0%.

[S304: Determination of the Addition Amount of the First Monomer to be Added to the Polymer Material]

Next, the addition amount of the first monomer or the derivative of the first monomer to be added to the polymer material is determined based on the proportional relationship obtained in S303. Specifically, the range of the residual ratio in the target polymer material is determined in advance from the proportion of the number of molecules of the second monomer to the number of molecules of the first monomer. The range of the proportion of the number of molecules of second monomer to the number of molecules of the first monomer is determined, and according to the determined range, the addition amount of the second monomer to be added is determined. At this time, it is preferable to select the proportion to make the residual ratio of the resin component to not more than 10%, and it is more preferable to select the proportion to make the residual ratio to not more than 5%. In this way, a high quality polymer material can be produced by using the recovered inorganic filler. Besides, the residual ratio corresponding to arbitrary two points may be examined. At this time, the addition amount of the first monomer to be added is determined from the above proportion and the residual ratio supplementing the obtained two points. Then, the number of molecules of the first monomer and the number of molecules of the second monomer constituting the resin component contained in the decomposed polymer material are calculated, and the addition amount of the first monomer to be added is selected so as to be the selected proportion of the second monomer to the first monomer in the reaction system. In this way, the inorganic filler containing the resin component in an arbitrary range to such a degree that can be reused may be recovered.

[S305: Mixing of the First Monomer with the Polymer Material]

Subsequently, the first monomer in the addition amount determined in S304 is added to and mixed with the polymer material, and then the first monomer is made into a supercritical state or subcritical state in the same manner as in S301 to carry out decomposition processing of the polymer material. At this time also, as in S301, the first monomer may be mixed as other solvent. Furthermore, the derivative of the first monomer in place of the first monomer may be added to the polymer material.

[S306: Recovery of the Inorganic Filler]

Then, the product after the decomposition processing is dissolved in and diluted with an arbitrary solvent, and then filtered with a filter. The pore diameter of a filter may be the same as that used in S302. The insoluble content remained in the filter is dried to recover the inorganic filler.

The recovered inorganic filler may be reused as a filler of the polymer material such as plastic or the like. As the method of reuse, for example, when it is reused as a raw material of a thermosetting resin molding material, the inorganic filler recovered product may be mixed with other raw material and reused by a known production method. At this time, the recovered inorganic filler alone may be used as a raw material without using a novel inorganic filler, or other chemical raw material and/or filler may be used together. The content of the inorganic filler to be reused is not particularly limited, but it is from 2 to 80% by weight, and preferably from 5 to 60% by weight, based on the total amount of the novel thermosetting resin molding material.

When the recovered product of the inorganic filler is used together with other chemical raw material, the chemical raw material to be used together is not particularly limited, and examples thereof include resins such as a novolac phenol resin, a resol type phenol resin, an epoxy resin, a melamine resin, an urea resin and the like. Furthermore, the chemical raw material obtained in the first embodiment may be used.

Furthermore, when the recovered product of the inorganic filler is used as a raw material of the thermosetting resin molding material together with an ordinary filler, the filler to be used together is not particularly limited, but an inorganic base material and/or an organic base material that is used in an ordinary thermosetting resin molding material may be used as a filler. Examples of the inorganic base material include glass fiber, calcium carbonate, calcined clay, talc, silica, diatomaceous earth, alumina, magnesium oxide and the like. The inorganic base materials may be selected depending on applications of a molded product or the like as necessary. Furthermore, examples of the organic base material include wood flour, pulp, plywood powder, paper pulverized powder, cloth pulverized powder and the like.

Subsequently, an operational effect of the embodiment will be described. According to the embodiment, a relationship between the proportion of the number of molecules of the second monomer to the number of molecules of the first monomer in a reaction system and the residual ratio of the polymer material is acquired in advance, whereby the addition amount of the first monomer to be added to the polymer material is determined based on the acquired relationship, and the decomposition efficiency of the polymer material may be controlled. Accordingly, the inorganic filler containing the unreacted resin component may be recovered, and the environmental load can be reduced.

When the inorganic filler contained in the polymer material is recovered and reused, and the amount of the resin component undecomposed is high, properties of the product obtained from reuse may be deteriorated. On the other hand, under the conditions with the high decomposition rate of the polymer material, it is difficult to obtain a chemical raw material having a high molecular weight.

However, according to the method of the embodiment, the amount of the first monomer to be added to the polymer material is found in advance, so that the inorganic filler may be recovered to such a degree that can be reused while decomposing the polymer material to the chemical raw material having a desired molecular weight. Accordingly, both of the resin component and the inorganic filler constituting the polymer material may be effectively reused.

Third Embodiment

FIG. 7 is a flow chart illustrating a method for producing a recycled resin of the embodiment. In the method for producing a recycled resin, the recycled resin is produced by chemically decomposing a resin component composed of a first monomer and a second monomer in a mixture of a polymer material containing a resin component with the first monomer or a derivative of the first monomer, and mixing the resin component decomposed with the second monomer or a derivative of the second monomer. The method comprises acquiring a relationship in advance between a proportion of number of molecules of the second monomer to number of molecules of the first monomer in a reaction system for producing the recycled resin from the resin component decomposed and a molecular weight of the recycled resin (S401);

determining an addition amount of the second monomer or the derivative of the second monomer to be added to the decomposed resin component based on the above-stated relationship (S402); and mixing the second monomer or the derivative of the second monomer in the addition amount determined with the resin component decomposed (S403).

Hereinafter, the embodiment will be described in detail.

[S401: Acquisition of a Relationship Between the Molar Ratio of the Second Monomer to the First Monomer in a Reaction System and the Molecular Weight of the Recycled Resin]

In S401, first, the decomposition reaction of the polymer material as described in the first or second embodiment is carried out, and then the molar ratio of the second monomer to the first monomer is determined with the addition of the second monomer in an arbitrary amount to the obtained chemical raw material. As the polymer material and the second monomer, those exemplified in the first embodiment may be used. Then, the chemical raw material and the second monomer are polymerized to produce a recycled resin, and the molecular weight of the obtained recycled resin is measured by the use of gel permeation chromatography (GPC). As specific examples of measurement units and conditions at that time, two of TSKgel GMHL and two of TSKgel G2000HL manufactured by Tosoh are used as a separation column, tetrahydrofuran is used as an eluent, a calibration curve is obtained in terms of polystyrene, a differential refractive index meter is used as a detector, a flow rate is set to 1 cm$^3$/min, and a temperature is set to 40° C. Next, the proportion of the number of molecules of the second monomer to the number of molecules of the first monomer in the reaction system is plotted on the transverse axis, while the molecular weight of the recycled resin produced is plotted on the vertical axis. The molecular weight plotted on the vertical axis may be the number average molecular weight (Mn) or the weight average molecular weight (Mw). In this way, data on a specific correlation between the proportion of the number of molecules of the second monomer to the number of molecules of the first monomer and the molecular weight of the recycled resin produced may be acquired.

The molecular weight (Mw) of the chemical raw material used in the production method of the embodiment is preferably in the range of $2.0 \times 10^2$ or more and $2.5 \times 10^3$ or less. This molecular weight, in case of the phenol resin, corresponds to 2 to 25 nuclei. More preferably, the molecular weight is in the range of $2.0 \times 10^2$ or more and $1.5 \times 10^3$ or less, and this molecular weight, in case of the phenol resin, corresponds to 2 to 15 nuclei. The molecular weight distribution (Mw/Mn) is preferably in the range of 1.0 or more and 3.0 or less, and more preferably in the range of 1.0 or more and 2.0 or less. In the embodiment, the term "molecular weight of the chemical raw material" refers to a molecular weight of the resin component in which the resin component contained in the chemical raw material is contained in an amount of not less than 50% by weight.

Furthermore, the recycled resin obtained by the production method of the embodiment has a molecular weight (Mw) of usually $2.0 \times 10^2$ or more and $1.0 \times 10^5$ or less, and has a molecular weight distribution (Mw/Mn) preferably in the range of 2.0 or more and 15 or less, and more preferably in the range of 3.0 or more and 10 or less. In the embodiment, the term "molecular weight of the recycled resin" refers to a molecular weight of the resin component in which the resin component contained in the recycled resin is contained in an amount of not less than 50% by weight.

[S402: Determination of the Addition Amount of the Second Monomer]

Subsequently, in S402, the proportion corresponding to the molecular weight of the recycled resin produced from the relationship obtained in S401 is selected. In this way, the addition amount of the second monomer or the derivative of the second monomer to be added to the decomposed resin component is determined. Specifically, the range of the target molecular weight of the recycled resin is determined in advance from the proportion of the mole numbers of the second monomer to the number of molecules of the first monomer of the chemical raw material. Then, the range of the proportion of the number of molecules of the second monomer to the number of the first monomer is determined, and according to the determined range, the amount of the second monomer is determined. Incidentally, in S401, the molecular weight of the recycled resin corresponding to arbitrary two points may be examined in the ranges in which the proportion of the number of molecules of the second monomer to the number of molecules of the first monomer in a reaction system has a correlation with the molecular weight of the recycled resin. At this time, in S402, the addition amount of the second monomer to be added is determined from the above proportion and the molecular weight of the chemical raw material supplementing the obtained two points.

[S403: Mixing of the Second Monomer with the Chemical Raw Material]

Subsequently, as described in the first or second embodiment, the chemical decomposition reaction of the resin component contained in the polymer material is carried out, and then the second monomer or the derivative of the second monomer in the addition amount determined in S402 is added to and mixed with the obtained chemical raw material. At this time, the chemical raw material is separated from the reaction mixture after the decomposition reaction, and then the second monomer or the derivative of the second monomer may be added, or the second monomer or the derivative of the second monomer may be added to the mixture as it is without separation.

[S404: Obtaining the Recycled Resin]

Processing conditions for the mixture of the second monomer with the chemical raw material obtained in S403 may be controlled mainly by a temperature and pressure. The temperature is usually not less than 100° C., preferably not more than the temperature in the aforementioned decomposition reaction, and more preferably 150° C. or more and 200° C. or less. In this way, the reaction may be carried out at a high rapid molecular rate while suppressing acceleration of gelation of the recycled resin component.

Furthermore, the pressure is usually preferably atmospheric pressure or more, not more than the pressure in the aforementioned decomposition reaction, and more preferably atmospheric pressure or more and 20 MPa or less. In this way, maintenance of a high molecular rate to an extent that does not cause the gelation and the suppression of the energy consumption are excellently balanced.

Meanwhile, the atmosphere is not particularly restricted, and any of air atmosphere or inert gas atmosphere such as nitrogen or the like may be selected, and any of an open system or a closed system may be used. Furthermore, the processing time may be controlled in the range of 1 to 60 minutes and may be usually preferably set to about 3 to 30 minutes.

Also, in the embodiment, there is obtained a recycled resin having the same chemical structure as that of the recycled resin described in the first embodiment.

The recycled resin, after a solvent, a residue and the like are separated by the separation method described in the first embodiment, may be reused as a raw material of the recycled resin composition.

Furthermore, in the obtained recycled resin, other than a resin component having a target molecular weight, a reaction solvent such as a first monomer or a second monomer, water and the like may be contained in a small amount.

As a method for producing a recycled resin composition, the recycled resin may be mixed with other raw material to produce the composition by a known production method. At this time, however, the recycled resin alone may be used as a raw material without using a novel raw material (virgin product), or may be used together with a virgin product and/or a filler. The content of the recycled resin is not particularly limited, but it is 2 to 80% by weight and preferably 5 to 60% by weight, based on the total amount of the recycled resin composition.

When the recycled resin is used together with other chemical raw material to produce the recycled resin composition, the chemical raw material to be used together is not particularly limited, and examples thereof include a novolac type phenol resin, a resol type phenol resin, an epoxy resin, a melamine resin and a urea resin.

Herein, when, for example, a novolac type phenol resin is used as the recycled resin, and the novolac type phenol resin is used together as a resin that is the other chemical raw material, usually, hexamethylenetetramine is used as a curing agent. The content of hexamethylenetetramine is preferably 10 to 25 parts by weight, based on 100 parts by weight in total of the recycled resin and the novolac type phenol resin, in the same manner as an ordinary polymer material. The total content of the recycled resin and the novolac type phenol resin is preferably 20 to 80% by weight and more preferably 30 to 60% by weight, based on the total amount of the recycled resin composition, even when hexamethylenetetramine is used as a curing agent. Furthermore, in order to control the curing rate, magnesium oxide, calcium hydroxide and the like may be used as a curing auxiliary agent as necessary.

According to the method of the embodiment, the derivative of the second monomer in place of the second monomer may be added to the chemical raw material to obtain a recycled resin. A resin different from the polymer material subjected to decomposition processing may be produced by using the thus-obtained recycled resin.

Subsequently, an operational effect of the embodiment will be described. According to the embodiment, a relationship between the proportion of the number of molecules of the second monomer to the number of molecules of the first monomer in a reaction system and the molecular weight of the recycled resin produced in the reaction system is previously acquired, whereby the addition amount of the second monomer to be added to the decomposition product of the resin component composed of a first monomer and a second monomer is determined based on the acquired relationship, and then the second monomer in an appropriate amount is mixed with the decomposed resin component in order to obtain a recycled resin having physical property to be desired. In this way, the recycled resin may be produced using the second monomer of a requisite minimum amount. Accordingly, the yield rate of the recycled resin may be improved, and the environmental load may be reduced.

As described above, embodiments of the present invention have been illustrated with reference to the drawings. However, these embodiments are examples of the present invention, and various other constructions may also be employed.

For example, in the third embodiment, there is exemplified a method of acquiring a relationship in advance between the proportion of the number of molecules of the second monomer to the number of molecules of the first monomer in a reaction system and the molecular weight of the recycled resin produced in the reaction system. However, the relationship between the proportion and the physical property of the recycled resin in terms of the molecular weight may be acquired in advance.

Furthermore, there may be employed a method comprising observing the physical property reflecting the molecular weight of the recycled resin produced in the reaction system with the addition of the second monomer to the reaction system for producing the recycled resin from the decomposed resin component, without acquiring a relationship in advance between the proportion of the number of molecules of the second monomer to the number of molecules of the first monomer in the reaction system and the physical property of the recycled resin produced in the reaction system.

For the purpose of increasing the accuracy, there may be employed a method comprising acquiring a relationship in advance between the proportion of the number of molecules of the second monomer to the number of molecules of the first monomer in a reaction system and the physical property of the recycled resin produced in the reaction system, and observing the physical property reflecting the molecular weight of the recycled resin produced in the reaction system with the addition of the second monomer to the reaction system for producing the recycled resin from the decomposed resin component.

Specifically, as shown in FIG. 8, a target molecular weight of the recycled resin is set (S501), and the second monomer is added to the reaction system for producing the recycled resin from the decomposed resin component (S502). That is, as described in the first or second embodiment, the chemical decomposition reaction of the resin component contained in the polymer material is carried out, and the second monomer is added to the obtained chemical raw material. Here, the addition amount of the second monomer to be added may be determined by conducting S401 and S402 explained in the third embodiment. As the polymer material and the second monomer, those explained in the first embodiment are used.

Subsequently, the physical property reflecting the molecular weight of the recycled resin produced in the reaction system are observed (S503), and then a relationship between the proportion of the number of molecules of the second monomer to the number of molecules of the first monomer in the reaction system and the physical property is acquired (S504). Subsequently, it is determined whether the molecular weight of the recycled resin reaches a target molecular weight (S505). When the molecular weight fails to reach the target (S505 No), the addition amount of the second monomer or the derivative of the second monomer to be added to the decomposed resin component is redetermined based on the acquired relationship (S506). In S506, the proportion of the number of molecules of the second monomer to the number of molecules of the first monomer is selected from the physical property corresponding to the target molecular weight of the recycled resin, and then the addition amount of the second monomer corresponding to the chemical raw material is determined. Subsequently, the second monomer in the determined amount is added to the reaction system and mixed. In this way, a recycled resin having a desired molecular weight may be obtained (S505 Yes, S507).

The physical property may be measured values obtained by one or more methods selected from any of a method for measuring physical property, a method for separation and analysis, spectrum analysis, electromagnetic analysis and thermal analysis.

The method for measuring physical property refers to a method of measuring viscosity, specific gravity, melting point, pH, solubility, particle size and the like. The method for separation and analysis refers to a gas chromatography method, a gel permeation chromatography method, an ion chromatography method, a liquid chromatography method and the like. Spectrum analysis refers to a light scattering method, an infrared absorption method and an ultraviolet absorption method. Electromagnetic analysis refers to a nuclear magnetic resonance (NMR) method, a mass spectrometry (MS) method and the like. Thermal analysis refers to a thermogravimetric method and a differential thermal analysis method.

According to the above method, while the second monomer of a requisite minimum amount is mixed with the decomposed resin component, the recycled resin may be produced. Accordingly, the yield rate of the recycled resin may be improved, and the environmental load may be reduced.

EXAMPLES

Example 1

Hereinafter, the first invention will be illustrated in detail referring to FIG. 1 by way of Example. However, the present invention is not restricted to the Example.

[S101: Acquisition of Data on a Relationship Between the Proportion of the Number of Molecules of the Second Monomer to the Number of Molecules of the First Monomer in a Reaction System and the Molecular Weight of the Chemical Raw Material Produced in the Reaction System]

As a polymer material, one obtained by pulverizing a cured product of a glass fiber-reinforced phenol resin molding material (glass fiber: about 60% contained), followed by classifying to a particle diameter of not more than 250 μm was used. In the polymer material, a first monomer (monomer A in Table 1) was phenol, and a second monomer (monomer B in Table 1) was formaldehyde. As the content of each monomer per 1 g of the polymer material, the content of the first monomer was $3.3 \times 10^{-3}$ mole/g and the content of the second monomer was $5.5 \times 10^{-3}$ mole/g.

Here, the phenol resin was formed with a plurality of groups composed of a hydroxyphenylene group and a methylene group bonded thereto. The number of hydroxyphenylene groups constituting the phenol resin was converted as the number of molecules of the first monomer, while the number of methylene groups constituting the phenol resin was converted as the number of molecules of the second monomer.

When the above polymer material was added to a mixture of the first monomer with water, powdery calcium hydroxide was added as a base catalyst. The amounts of respective reagents in use are shown in Table 1. The resulting mixture was introduced into an autoclave (internal volume: 200 cm$^3$, a product of Nitto Kouatsu Co., Ltd.), and then heated while stirring at a rate of 300 rpm to have an internal temperature of 260° C., whereby the internal pressure in the reactor was increased up to 3.5 MPa and maintained for 30 minutes to carry out decomposition processing.

The recovered product after the decomposition processing was measured by the use of gel permeation chromatography (GPC). At this time, two of TSKgel GMHL and two of TSKgel G2000HL manufactured by Tosoh were used as a separation column, THF was used as an eluent, a calibration curve was obtained in terms of polystyrene, a differential refractive index meter was used as a detector, a flow rate was set to 1 cm$^3$/min, and a temperature was set to 40° C. Further, the molecular weight of the chemical raw material was calculated as the number average molecular weight and

TABLE 1

| | Weight to be introduced | | | | Number of molecules to be introduced | | | | Molar ratio to be introduced |
|---|---|---|---|---|---|---|---|---|---|
| | Polymer material [g] | Reaction solvent Phenol [g] | Water [g] | Catalyst Calcium hydroxide [g] | Phenol (Polymer material) Monomer A (①) [mol] | Phenol (Reaction solvent) Monomer A (②) [mol] | Phenol Monomer A (③) = ① + ② [mol] | Formaldehyde (Polymer material) Monomer B (④) [mol] | Formaldehyde/Phenol Monomer B/ Monomer A (=④/③) [—] |
| 1-1 | 87.4 | 85.6 | 21.3 | 0.9 | 0.29 | 0.91 | 1.20 | 0.48 | 0.40 |
| 1-2 | 58.3 | 85.6 | 21.3 | 0.6 | 0.19 | 0.91 | 1.10 | 0.32 | 0.29 |
| 1-3 | 26.7 | 85.6 | 21.3 | 0.3 | 0.09 | 0.91 | 1.00 | 0.15 | 0.15 |
| 1-4 | 12.0 | 85.6 | 21.3 | 0.1 | 0.04 | 0.91 | 0.95 | 0.07 | 0.07 |
| 1-5 | 87.4 | 63.0 | 43.9 | 0.9 | 0.29 | 0.67 | 0.96 | 0.48 | 0.50 |
| 1-6 | 87.4 | 55.0 | 51.9 | 0.9 | 0.29 | 0.59 | 0.87 | 0.48 | 0.55 |
| 1-7 | 87.4 | 15.0 | 91.9 | 0.9 | 0.29 | 0.16 | 0.45 | 0.48 | 1.07 |
| 1-8 | 87.4 | 0.0 | 106.9 | 0.9 | 0.29 | 0.00 | 0.29 | 0.48 | 1.67 |

| | Decomposition results | | | |
|---|---|---|---|---|
| | Decomposition rate of polymer material [wt %] | Molecular weight of chemical raw material Mn [—] | Molecular weight of chemical raw material Mw [—] | Yield of chemical raw material [g] |
| 1-1 | 100 | 478 | 700 | 99 |
| 1-2 | 100 | 418 | 560 | 66 |
| 1-3 | 100 | 401 | 565 | 30 |
| 1-4 | 100 | 390 | 571 | 13 |
| 1-5 | 95 | 673 | 1865 | 94 |
| 1-6 | 90 | 753 | 2881 | 89 |
| 1-7 | 5 | Unmeasurable | Unmeasurable | 4 |
| 1-8 | 5 | Unmeasurable | Unmeasurable | 4 |

The decomposition rate of the polymer material was evaluated in the following procedure. The product after the decomposition processing was dissolved in and diluted with tetrahydrofuran (hereinafter referred to as THF), and then filtered with a filter of 1.0 μm. A THF-insoluble residue remained in the filter was dried at 100° C. for 12 hours and then weighed, the weight loss corresponding to the weight of the introduced polymer material was evaluated, and the decomposition rate of the polymer material was evaluated using the following Formulae 2 to 5. The decomposition rate was 100%.

Decomposition rate [%]={weight loss (g)/amount (g) of resin component of polymer material}×100   Formula 2

Weight loss=weight (g) of introduced polymer material−weight (g) of THF-insoluble residue   Formula 3

Amount of resin component of polymer material=weight (g) of introduced polymer material−(weight (g) of glass fiber in introduced polymer material)   Formula 4

Weight of glass fiber in introduced polymer material=weight (g) of introduced polymer material×0.6   Formula 5 the weight average molecular weight by analyzing the chart obtained by GPC analysis excluding the peak of the first monomer (phenol).

As a result, under the condition with the molar ratio of the second monomer to the first monomer of smaller than 1, the decomposition rate of the polymer material was high, i.e., not less than 90%. On the other hand, under the condition with the molar ratio of the second monomer to the first monomer of greater than 1, the decomposition rate of the polymer material was extremely low, i.e., about 5%, so that the decomposition processing hardly proceeded. When the molar ratio of the second monomer to the first monomer was greater than 1, it was unable to measure the molecular weight from the recovered product after the decomposition processing by the GPC analysis.

FIGS. 9 and 10 each illustrate a relationship between the molar ratio of the second monomer to the first monomer and the molecular weight of the chemical raw material obtained from the measurement results of GPC. In FIGS. 9 and 10, the molar ratio of the second monomer to the first monomer in the reaction system is plotted on the transverse axis. In FIG. 9, the number average molecular weight (Mn) of the chemical raw material obtained from the measurement results of GPC is plotted on the vertical axis. In FIG. 10, the weight average molecular weight (Mw) of the chemical raw material obtained from the measurement results of GPC is plotted on the vertical axis.

From FIGS. 9 and 10, it is found that, as the molar ratio of the second monomer to the first monomer is smaller, the molecular weight of the chemical raw material becomes smaller. That is, if a relationship diagram is substantially found before the decomposition processing is carried out, the molecular weight of the chemical raw material to be recovered can be controlled by adjusting the molar ratio of the second monomer to the first monomer. Similarly, it is found that, from FIGS. 9 and 10, although the molar ratio of the second monomer to the first monomer is made small, a chemical raw material having a smaller molecular weight than a certain predetermined value (threshold) may not be recovered. From this fact, when the chemical raw material having a low molecular weight is recovered, the molar ratio of the second monomer to the first monomer may be made small, i.e., a requisite minimum amount, by obtaining a threshold, that is, the polymer material may be highly effectively decomposed with the addition of the first monomer in an appropriate amount.

[S102: Determination of the Addition Amount of the First Monomer to be Added to the Polymer Material]

An approximate curve 1 was obtained, as shown in FIG. 9(b), from data of 1-1, 1-5 and 1-6 in Table 1 among data shown in Table 1 and FIG. 9(a). An approximate expression of the approximate curve 1 was $y=1.9\times10^3 x - 2.6\times10^2$. Furthermore, an approximate curve 2 was obtained from data of 1-2, 1-3 and 1-4. An approximate expression was $y=1.3\times10^2 x + 3.8\times10^2$. A threshold of the molar ratio of the second monomer to the first monomer was obtained from a point where the approximate curve 1 crossed the approximate curve 2. Similarly, approximate curves 3 and 4 were obtained, as shown in FIG. 10(b), from data shown in Table 1 and FIG. 10(a). A threshold of the molar ratio of the second monomer to the first monomer was obtained. As a result, 0.4 of a threshold was obtained.

Next, as a polymer material, 87.4 g of the polymer material used in S101 was prepared. 0.91 mole of phenol was decided to be added from the facts that the amount of phenol (monomer A) constituting the polymer material was 0.29 mole and the amount of formaldehyde (monomer B) was 0.48 mole.

[S103: Mixing of the First Monomer with the Polymer Material]

To a mixture of 0.91 mole of phenol with 21.3 g of water was added 87.4 g of the polymer material. At this time, 0.9 g of powdery calcium hydroxide was added as a base catalyst.

[S104: Making the First Monomer into a Supercritical State or Subcritical State]

The mixture obtained in S103 was introduced into an autoclave (internal volume: 200 cm³, a product of Nitto Kouatsu Co., Ltd.), and then heated while stirring at a rate of 300 rpm to have an internal temperature of 260° C., whereby the internal pressure in the reactor was increased up to 3.5 MPa and maintained for 30 minutes to carry out decomposition processing.

[S105: Obtaining the Chemical Raw Material]

The recovered product after the decomposition processing was measured by the use of GPC in the same manner as in S101. As a result, it was found that a chemical raw material having a number average molecular weight (Mn) of 478 and a weight average molecular weight (Mw) of 700 was produced.

Subsequently, a recycled resin was produced from the chemical raw material produced in S105.

Evaluation 1-1

To the recovered product after the decomposition processing was added 18 g of an aqueous solution of formalin (formaldehyde: 43% contained) as a multi-functional compound. The resulting mixture was heated while stirring at a rate of 300 rpm to have an internal temperature of 220° C., whereby the internal pressure in the reactor was increased up to 2 MPa and maintained for 20 minutes to carry out a reaction with the multi-functional compound. Subsequently, the product after the decomposition processing was dissolved in and diluted with methanol, and then filtered with a filter of 1.0 μm to recover a filtrate. The filtrate was heated under ordinary pressure or reduced pressure, whereby volatile components such as methanol, a reaction solvent (water, phenol) and the like were evaporated to recover a recycled resin as a nonvolatile component. The resulting recycled resin was analyzed by GPC in the same manner as in S101 to evaluate the molecular weight. As for the molecular weight of the resulting recycled resin, the number average molecular weight (Mn) was 914, while the weight average molecular weight (Mw) was 4,658.

Evaluation 1-2

The decomposition processing of a glass fiber-reinforced phenol resin molding material and the reaction with a multi-functional compound were conducted in the same procedure as in Evaluation 1-1, except that 21 g of an aqueous solution of formalin (formaldehyde: 43% contained) was added as a multi-functional compound. As for the molecular weight of the resulting recycled resin, the number average molecular weight (Mn) was 995, while the weight average molecular weight (Mw) was 7,289.

Evaluation 1-3

The decomposition processing of a glass fiber-reinforced phenol resin molding material and the reaction with a multi-functional compound were conducted in the same manner as in Evaluation 1-1, except that 27 g of an aqueous solution of formalin (formaldehyde: 43% contained) was added as a multi-functional compound. As for the molecular weight of the resulting recycled resin, the number average molecular weight (Mn) was 1,071, while the weight average molecular weight (Mw) was 14,967.

From the above results, the molecular weights of the recycled resins were excellent. Furthermore, it was found that the gel time, bending strength and bending elastic modulus were equal to the conventional ones, and the recycled resins having a quality comparable to conventional recycled resins were obtained.

Example 2

Furthermore, the third invention will be illustrated in detail referring to FIG. 5 by way of Example. However, the present invention is not restricted to the Example.

[S301: Decomposition Processing of the Polymer Material]

As a polymer material, one obtained by pulverizing a cured product of a glass fiber-reinforced phenol resin molding material (glass fiber: about 60% contained), followed by classifying to a particle diameter of not more than 250 μm was used. In the polymer material, a first monomer (monomer A) was phenol, and a second monomer (monomer B) was formaldehyde. As for the content of each monomer per 1 g of the polymer material, the content of the first monomer was $3.3\times10^{-3}$ mole/g and the content of the second monomer was $5.5\times10^{-3}$ mole/g.

Here, the phenol resin was formed with a plurality of groups composed of a hydroxyphenylene group and a methylene group bonded thereto. The number of hydroxyphenylene groups constituting the phenol resin was converted as the number of molecules of the first monomer, while the number of methylene groups constituting the phenol resin was converted as the number of molecules of the second monomer.

When the above polymer material was added to a mixture of the first monomer with water, powdery calcium hydroxide was added as a base catalyst. The amounts of respective reagents in use are shown in Table 2. The resulting mixture was introduced into an autoclave (internal volume: 200 cm$^3$, a product of Nitto Kouatsu Co., Ltd.), and then heated while stirring at a rate of 300 rpm to have an internal temperature of 260° C., whereby the internal pressure in the reactor was increased up to 3.5 MPa and maintained for 30 minutes to carry out decomposition processing.

Furthermore, the THF-soluble matter was measured by the use of gel permeation chromatography (GPC). At this time, two of TSKgel GMHL and two of TSKgel G2000HL manufactured by Tosoh were used as a separation column, THF was used as an eluent, a calibration curve was obtained in terms of polystyrene, a differential refractive index meter was used as a detector, a flow rate was set to 1 cm$^3$/min, and a temperature was set to 40° C. Further, the molecular weight of the chemical raw material containing the decomposed resin component was obtained by analyzing the chart obtained by GPC analysis excluding the peak of the first monomer (phenol).

TABLE 2

| | Weight to be introduced | | | Number of molecules to be introduced | | | | Molar ratio to be introduced |
|---|---|---|---|---|---|---|---|---|
| | | | | Phenol (Polymer material) Monomer A | Phenol (Reaction solvent) Monomer A | Phenol Monomer A | Formaldehyde (Polymer material) Monomer B | Formaldehyde/ Phenol Monomer B/ Monomer A |
| | Polymer material [g] | Reaction solvent Phenol [g] | Water [g] | Catalyst Calcium hydroxide [g] | (①) [mol] | (②) [mol] | ①+② [mol] | (④) [mol] | (=④/③) [—] |
| 2-1 | 87.4 | 85.6 | 21.3 | 0.9 | 0.29 | 0.91 | 1.20 | 0.48 | 0.40 |
| 2-2 | 58.3 | 85.6 | 21.3 | 0.6 | 0.19 | 0.91 | 1.10 | 0.32 | 0.29 |
| 2-3 | 26.7 | 85.6 | 21.3 | 0.3 | 0.09 | 0.91 | 1.00 | 0.15 | 0.15 |
| 2-4 | 12.0 | 85.6 | 21.3 | 0.1 | 0.04 | 0.91 | 0.95 | 0.07 | 0.07 |
| 2-5 | 87.4 | 65.0 | 41.9 | 0.9 | 0.29 | 0.69 | 0.98 | 0.48 | 0.49 |
| 2-6 | 87.4 | 63.0 | 43.9 | 0.9 | 0.29 | 0.67 | 0.96 | 0.48 | 0.50 |
| 2-7 | 87.4 | 58.0 | 48.9 | 0.9 | 0.29 | 0.62 | 0.91 | 0.48 | 0.53 |
| 2-8 | 87.4 | 55.0 | 51.9 | 0.9 | 0.29 | 0.59 | 0.87 | 0.48 | 0.55 |
| 2-9 | 87.4 | 15.0 | 91.9 | 0.9 | 0.29 | 0.16 | 0.45 | 0.48 | 1.07 |
| 2-10 | 87.4 | 0.0 | 106.9 | 0.9 | 0.29 | 0.00 | 0.29 | 0.48 | 1.67 |

| | Molecular weight of chemical raw material | | Yield of chemical raw material [g] | Residual ratio of resin component contained in inorganic filler recovered product [wt %] |
|---|---|---|---|---|
| | Mn [—] | Mw [—] | | |
| 2-1 | 478 | 700 | 99 | 0 |
| 2-2 | 418 | 560 | 66 | 0 |
| 2-3 | 401 | 565 | 30 | 0 |
| 2-4 | 390 | 571 | 13 | 0 |
| 2-5 | 611 | 1215 | 95 | 4 |
| 2-6 | 673 | 1865 | 94 | 5 |
| 2-7 | 721 | 2535 | 91 | 8 |
| 2-8 | 753 | 2881 | 89 | 10 |
| 2-9 | Unmeasurable | Unmeasurable | 4 | 95 |
| 2-10 | Unmeasurable | Unmeasurable | 4 | 95 |

[S302: Evaluation of the Residual Ratio of the Undecomposed Resin Component]

The residual ratio of the unreacted resin component was evaluated in the following procedure. The product after the decomposition processing was dissolved in and diluted with THF, and then filtered with a filter of 1.0 μm. A THF-insoluble content remained in the filter was dried at 100° C. for 12 hours and then weighed. The dried THF-insoluble residue was taken as an inorganic filler recovered product (1). Under the conditions of 5 hour/500° C., the inorganic filler recovered product (1) was subjected to an incineration treatment, whereby a residue (2) after incineration was obtained, and the residual ratio of the unreacted resin component contained in the inorganic filler recovered product (1) was calculated using the Formula 1 illustrated in the second embodiment.

[S303: Acquisition of Data on a Relationship between the Proportion of the Number of Molecules of the Second Monomer to the Number of Molecules of the First Monomer in a Reaction System and the Residual Ratio of the Undecomposed Resin Component]

FIG. 11 illustrates a relationship between the molar ratio of the second monomer to the first monomer and the residual ratio of the unreacted resin component contained in the inorganic filler recovered product. From FIG. 11, it is found that, as the molar ratio of the second monomer to the first monomer is smaller, the residual ratio becomes smaller. That is, if a relationship diagram is substantially found before the decomposition processing is carried out, the residual ratio of the unreacted resin component contained in the inorganic filler recovered product may be controlled by adjusting the molar ratio of the second monomer to the first monomer.

Similarly, it is found that, from FIG. 11, when the molar ratio of the second monomer to the first monomer is made small, the residual ratio reaches 0% from a certain predetermined value (threshold). From this fact, it is found that the first monomer in an appropriate amount may be added by obtaining a threshold, and decomposition processing of the polymer material may be carried out highly effectively.

[S304: Determination of the Addition Amount of the First Monomer to be Added to the Polymer Material]

From data shown in Table 2 and FIG. 11, the first monomer was added such that the residual ratio of the unreacted resin component was 2, 4, 5, 8 and 10%, that is, 87.4 g of the polymer material used in S301 was prepared as a polymer material. 0.73, 0.69, 0.67, 0.62 and 0.59 mole of phenol were decided to be added respectively from the facts that the amount of phenol (first monomer) constituting the polymer material was 0.29 mole and the amount of formaldehyde (second monomer) was 0.48 mole.

[S305: Mixing of the First Monomer with the Polymer Material]

To a mixture of 0.69 mole of phenol with 41.9 g of water was added 87.4 g of the above polymer material. At this time, 0.9 g of powdery calcium hydroxide was added as a base catalyst to give Example 2-A. Further, to a mixture of 0.67 mole of phenol with 43.9 g of water was added 87.4 g of the above polymer material. At this time, 0.9 g of powdery calcium hydroxide was added as a base catalyst to give Example 2-B. To a mixture of 0.62 mole of phenol with 48.9 g of water was added 87.4 g of the above polymer material. At this time, 0.9 g of powdery calcium hydroxide was added as a base catalyst to give Example 2-C. To a mixture of 0.59 mole of phenol with 51.9 g of water was added 87.4 g of the above polymer material. At this time, 0.9 g of powdery calcium hydroxide was added as a base catalyst to give Example 2-D. To a mixture of 0.73 mole of phenol with 38.3 g of water was added 87.4 g of the above polymer material. At this time, 0.9 g of powdery calcium hydroxide was added as a base catalyst to give Example 2-E. In Examples 2-A and 2-B, n was 2. In Example 2-E, n was 3. In other Examples, n was 1. The mixtures of respective Examples obtained in S305 were introduced into an autoclave (internal volume: 200 cm$^3$, a product of Nitto Kouatsu Co., Ltd.), and then heated while stirring at a rate of 300 rpm to have an internal temperature of 260° C., whereby the internal pressure in the reactor was increased up to 3.5 MPa and maintained for 30 minutes to carry out decomposition processing.

[S306: Recovery of the Inorganic Filler]

The product after the decomposition processing was dissolved in and diluted with tetrahydrofuran (hereinafter referred to as THF), and then filtered with a filter of 1.0 μm. A THF-insoluble content remained in the filter was dried at 100° C. for 12 hours and then weighed. The dried THF-insoluble residue was taken as an inorganic filler recovered product. The residual ratio of the unreacted resin component contained in the obtained inorganic filler recovered product was examined in the method shown in S302 and as a result, the residual ratio of Example 2-A was 4%, the residual ratio of Example 2-B was 5%, the residual ratio of Example 2-C was 8%, the residual ratio of Example 2-D was 10%, and the residual ratio of Example 2-E was 2%.

Evaluation 2-1

Subsequently, a molding material was produced using the inorganic filler recovered in S306. The properties of the molding material obtained by reusing the inorganic filler recovered in Examples 2-A, 2-B, 2-C and 2-D as a raw material were evaluated. A molding material composed of an inorganic filler recovered product (10%), a glass fiber (50%), and a phenol novolac resin and hexamethylenetetramine (40% in total) was adjusted to obtain a test piece using a transfer molding machine under the curing conditions of 3 min/175° C. In accordance with a test method of JIS K 6911, the bending strength of the test piece was evaluated. For the purpose of comparison, a virgin molding material was prepared. That is, without employing the inorganic filler recovered product, a molding material composed of a glass fiber (60%), and a phenol novolac resin and hexamethylenetetramine (40% in total) was prepared, and the bending strength was evaluated in the same manner. The results are shown in Table 3.

TABLE 3

| Inorganic filler recovered product | Residual ratio of resin component contained in inorganic filler recovered product % | Mixing ratio of inorganic filler recovered product used in production of molding material % | Strength of molding material (bending strength) MPa | Remarks |
|---|---|---|---|---|
| Example 2-A | 4 | 10 | 210 | Average value (n = 2) |
| Example 2-B | 5 | 10 | 203 | Average value (n = 2) |
| Example 2-C | 8 | 10 | 182 | — |
| Example 2-D | 10 | 10 | 158 | — |
| Example 2-E | 2 | 10 | 207 | — |
|  | 2 | 30 | 198 | — |
|  | 2 | 60 | 141 | — |
| Comparative Example (virgin material) |  | 0 | 208 | Average value (n = 8), Maximum: 214, Minimum: 198 |

As shown in Table 3, for all of the residual ratios of the unreacted resin components contained in the inorganic filler recovered products of 4, 5, 8 and 10%, the results comparable to those of the virgin molding material of the comparison were obtained.

Evaluation 2-2

Furthermore, the properties of the molding material obtained by reusing the inorganic filler recovered in Example 2-E as a raw material were evaluated. A molding material A composed of an inorganic filler recovered product (20%), a glass fiber (40%), and a phenol novolac resin and hexamethylenetetramine (40% in total), a molding material B composed of an inorganic filler recovered product (30%), a glass fiber (30%), and a phenol novolac resin and hexamethylenetetramine (40% in total), and a molding material C composed of an inorganic filler recovered product (60%), and a phenol novolac resin and hexamethylenetetramine (40% in total) were respectively adjusted to obtain a test piece using a transfer molding machine under the curing conditions of 3 min/175° C. In accordance with a test method of JIS K 6911, the bending strength of the test piece was evaluated. For the purpose of comparison, a virgin molding material was prepared. That is, without employing the inorganic filler recovered product, a molding material composed of a glass fiber (60%), and a phenol novolac resin and hexamethylenetetramine (40% in total) was prepared, and the bending strength was evaluated in the same manner. The results are shown in Table 3.

As shown in Table 3, when the residual ratio of the unreacted resin component contained in the inorganic filler recovered product was 2%, although the amount of the inorganic filler recovered product to be mixed was equal to the amount of the glass fiber of the virgin product, the results of the recycled molding material comparable to those of the virgin molding material were obtained.

Example 3

Furthermore, the second invention will be illustrated in detail referring to FIG. 7 by way of Example. However, the present invention is not restricted to the Example.

[S401: Acquisition of Data on a Relationship between the Proportion of the Number of Molecules of the Second Monomer to the Number of Molecules of the First Monomer in a Reaction System and the Molecular Weight of the Recycled Resin]

To the decomposition product of 2-1 obtained in the above S301 was added 18 g of an aqueous solution of formalin (formaldehyde: 43% contained) as a second monomer. The amounts of respective reagents used are shown in Table 4.

nol, and then filtered with a filter of 1.0 μm to recover a filtrate. The filtrate was heated under ordinary pressure or reduced pressure, whereby volatile components such as methanol, a reaction solvent (water, phenol) and the like were evaporated to recover a recycled resin as a nonvolatile component.

The recovered recycled resin was measured by the use of gel permeation chromatography (GPC). At this time, two of TSKgel GMHL and two of TSKgel G2000HL manufactured by Tosoh were used as a separation column, THF was used as an eluent, a calibration curve was obtained in terms of polystyrene, a differential refractive index meter was used as a detector, a flow rate was set to 1 $cm^3$/min, and a temperature was set to and 40° C. Further, the molecular weight of the recycled resin was calculated by analyzing the chart obtained by GPC analysis excluding the peak of the first monomer (phenol) added as a reaction solvent.

FIGS. 12 and 13 each illustrate a relationship between the molar ratio of the second monomer to the first monomer and the molecular weight of the recycled resin obtained from measurement results of GPC. In FIGS. 12 and 13, the molar ratio of the second monomer to the first monomer in a reaction system is plotted on the transverse axis. In FIG. 12, the number average molecular weight (Mn) of the recycled resin obtained from measurement results of GPC is plotted on the vertical axis. In FIG. 13, the weight average molecular weight (Mw) of the recycled resin obtained from measurement results of GPC is plotted on the vertical axis.

TABLE 4

| | Weight to be introduced | | | | Number of molecules to be introduced | | | |
|---|---|---|---|---|---|---|---|---|
| | | | | | Phenol (Polymer material) Monomer A | Phenol (Reaction solvent) Monomer A | Phenol Monomer A | Formaldehyde (Polymer material) Monomer B |
| | Polymer material | Reaction solvent | Catalyst Calcium hydroxide | Molecular weight adjust | | | | |
| | | Phenol | Water | | Formalin | (①) | (②) | ①+② | (④) |
| | [g] | [g] | [g] | [g] | [g] | [mol] | [mol] | [mol] | [mol] |
| 3-1 | 87.4 | 85.6 | 21.3 | 0.9 | 0.0 | 0.29 | 0.91 | 1.20 | 0.48 |
| 3-2 | 87.4 | 85.6 | 21.3 | 0.9 | 12.5 | 0.29 | 0.91 | 1.20 | 0.48 |
| 3-3 | 87.4 | 85.6 | 21.3 | 0.9 | 18.0 | 0.29 | 0.91 | 1.20 | 0.48 |
| 3-4 | 87.4 | 85.6 | 21.3 | 0.9 | 21.0 | 0.29 | 0.91 | 1.20 | 0.48 |
| 3-5 | 87.4 | 85.6 | 21.3 | 0.9 | 27.0 | 0.29 | 0.91 | 1.20 | 0.48 |
| 3-6 | 87.4 | 55.0 | 51.9 | 0.9 | 0.0 | 0.29 | 0.59 | 0.87 | 0.48 |

| | Number of molecules to be introduced | | Molar ratio to be introduced | Production results | | | |
|---|---|---|---|---|---|---|---|
| | Formaldehyde (Molecular weight adjust) Monomer B | Formaldehyde Monomer B (⑥) = | Formaldehyde/Phenol Monomer B/ Monomer A | Decomposition rate of polymer | Molecular weight of regenerated resin | | Yield of regenerated resin |
| | (⑤) | ④+⑤ | (=⑥/③) | material | Mn | Mw | |
| | [mol] | [mol] | [—] | [wt %] | [—] | [—] | [g] |
| 3-1 | 0.00 | 0.48 | 0.40 | 100 | 478 | 700 | 99 |
| 3-2 | 0.18 | 0.66 | 0.55 | 100 | 757 | 2898 | 144 |
| 3-3 | 0.26 | 0.74 | 0.62 | 100 | 914 | 4658 | 162 |
| 3-4 | 0.30 | 0.78 | 0.65 | 100 | 995 | 7289 | 171 |
| 3-5 | 0.39 | 0.87 | 0.72 | 100 | 1071 | 14967 | 190 |
| 3-6 | 0.00 | 0.48 | 0.55 | 90 | 753 | 2881 | 89 |

The mixture was heated while stirring at a rate of 300 rpm to have an internal temperature of 220° C., whereby the internal pressure in the reactor was increased up to 2 MPa and maintained for 20 minutes to carry out a reaction with a multi-functional compound. Subsequently, the product after the reaction was dissolved in and diluted with metha- From FIGS. 12 and 13, a relationship between the molar ratio of the second monomer to the first monomer and the molecular weight of the recycled resin may be found. That is, if a relationship diagram is substantially found before the recycle processing is carried out, the molecular weight of the recycled resin may be controlled by adjusting the molar ratio of the second monomer to the first monomer. From this fact, the recycled resin may be highly effectively produced with the addition of the second monomer in an appropriate amount.

[S402: Determination of the Addition Amount of the Second Monomer to be Added to the Chemical Raw Material]

Example 3-A

It was considered that a recycled resin having Mn of $9.1 \times 10^2$ and Mw of $4.7 \times 10^3$ was obtained. Referring to Table 4, FIG. 12 and FIG. 13 obtained in S401, the molar ratio of the second monomer to the first monomer was 0.62.

Example 3-B

It was considered that a recycled resin having Mn of $1.0 \times 10^3$ and Mw of $7.3 \times 10^3$ was obtained. Referring to Table 4, FIG. 12 and FIG. 13 obtained in S401, the molar ratio of the second monomer to the first monomer was 0.65.

Example 3-C

It was considered that a recycled resin having Mn of $1.1 \times 10^3$ and Mw of $1.5 \times 10^4$ was obtained. Referring to Table 4, FIG. 12 and FIG. 13 obtained in S401, the molar ratio of the second monomer to the first monomer was 0.72.

[S403: Mixing of the Second Monomer with the Chemical Raw Material]

With respect to Example 3-A, to the decomposition product of 2-1 shown in Table 2 was added 18 g of an aqueous solution of formalin (formaldehyde: 43% contained). With respect to Example 3-B, to the decomposition product of 2-1 shown in Table 2 was added 21 g of an aqueous solution of formalin (formaldehyde: 43% contained). With respect to Example 3-C, to the decomposition product of 2-1 shown in Table 2 was added 27 g of an aqueous solution of formalin (formaldehyde: 43% contained). With respect to each Example, the mixture was heated while stirring at a rate of 300 rpm to have an internal temperature of 220° C., whereby the internal pressure in the reactor was increased up to 2 MPa and maintained for 20 minutes to carry out a reaction with the second monomer.

[S404: Obtaining the Recycled Resin]

With respect to respective Examples, the product after the reaction was dissolved in and diluted with methanol, and then filtered with a filter of 1.0 μm to recover a filtrate. The filtrate was heated under ordinary pressure or reduced pressure, whereby volatile components such as methanol, a reaction solvent (water, phenol) and the like were evaporated to recover a recycled resin as a nonvolatile component. The obtained recycled resin was analyzed by GPC in the same manner as in S401 to evaluate the molecular weight. As for the molecular weight of the obtained recycled resin, in Example 3-A, the number average molecular weight (Mn) was 913, and the weight average molecular weight (Mw) was 4,705. Furthermore, in Example 3-B, the number average molecular weight (Mn) was 1,015, and the weight average molecular weight (Mw) was 7,325. Furthermore, in Example 3-C, the number average molecular weight (Mn) was 1,092, and the weight average molecular weight (Mw) was 15,117.

From the above results, the molecular weights of the recycled resins were excellent. Furthermore, it was found that the gel time, bending strength and bending elastic modulus were equal to the conventional ones, and the recycled resins having a quality comparable to conventional recycled resins were obtained.

Example 4

Furthermore, a modified example of the second invention will be illustrated in detail referring to FIG. 8 by way of Example. However, the present invention is not restricted to the Example.

As a recycled resin manufacturing apparatus, a pilot plant equipped with a raw material supply unit, a decomposition reaction unit, a polymerization reaction unit, a solid-liquid separation unit and an evaporation unit was used. The raw material supply unit is equipped with a diaphragm pump (a slurry supply unit) for supplying a slurry having a maximum discharge pressure of 15 MPa and a diaphragm pump (a formalin pump) for supplying formalin having a maximum discharge pressure of 15 MPa. The decomposition reaction unit and the polymerization reaction unit are equipped with SUS316 tube type reactors having an internal diameter of 16.7 mm. The solid-liquid separation unit is equipped with a centrifugal separator (decanter). The evaporation unit is equipped with a falling film type evaporator, and is equipped with a vibration type viscometer (FVM80A-EXHT, a product of SekonicCorporation) capable of on-line measurement of the melt viscosity of the recycled resin obtained in the downstream of the aforementioned evaporator. In this Example, the term "physical properties reflecting the molecular weight of the recycled resin" refers to the melt viscosity measured at a frequency of 1,000 Hz at 150° C. with the aforementioned vibration type viscometer.

First, a plurality of recycled resins having different molecular weights were prepared, and the molecular weights were measured by the use of gel permeation chromatography (GPC). The molecular weights of respective recycled resins were calculated with the same apparatus configuration, measurement conditions and analysis method as in Example 1. Subsequently, using the vibration type viscometer provided in the evaporation unit of the recycled resin manufacturing apparatus (pilot plant), the melt viscosity of the aforementioned recycled resin having a different molecular weight at 150° C. was evaluated. FIG. 14 illustrates the weight average molecular weight (Mw) of the recycled resin evaluated by GPC, and the melt viscosity of the recycled resin evaluated at a frequency of 1,000 Hz at 150° C. using the vibration type viscometer. The melt viscosity of the recycled resin was measured from the relational expression of this figure, so that its molecular weight may be estimated.

[S501: Setting of the Target Molecular Weight of the Recycled Resin]

The target weight average molecular weight (Mw) of the recycled resin was set to $3.0 \times 10^3$, and a tolerance range of $2.7 \times 10^3$ to $3.3 \times 10^3$ corresponding to ±10% of the target value was set.

[S502: Addition of the Second Monomer to the Chemical Raw Material]

As a polymer material, in the same manner as in Example 1, one obtained by pulverizing a cured product of a glass fiber-reinforced phenol resin molding material (glass fiber: about 60% contained), followed by classifying to a particle diameter of not more than 250 μm was used. In the polymer material, a first monomer was phenol, and a second monomer was formaldehyde. As for the content of each monomer per 1 g of the polymer material, the content of the first monomer was $3.3 \times 10^{-3}$ mole/g and the content of the second monomer was $5.5 \times 10^{-3}$ mole/g.

A slurry comprising said polymer material of 34%, phenol of 55%, water of 10% and calcium hydroxide of 1% was prepared. Using a slurry supply pump in the raw material supply unit of the recycled resin manufacturing apparatus (pilot plant), the aforementioned slurry was supplied to the decomposition reaction unit at a flow rate of 158.4 kg/hr, and then chemical decomposition processing of the resin component contained in the polymer material was carried out. At this time, the reaction temperature was 300° C. and the reaction pressure was 10 MPa.

Next, using a formalin supply pump, to the polymerization reaction unit in the downstream unit of the above-stated decomposition reaction unit was supplied an aqueous solution of formalin (formaldehyde: 37% contained) as a second monomer at a flow rate of 14.7 kg/hr, and then it was mixed with the product at the decomposition reaction unit to carry out the reaction. At this time, the reaction temperature was 170° C. and the reaction pressure was 10 MPa. Subsequently, in the solid-liquid separation unit, solid components contained in the product after the reaction were removed, and then in the evaporation unit, unreacted phenol and water were evaporated to recover a recycled resin. Incidentally, all of the aforementioned supply unit, the decomposition reaction unit, the polymerization reaction unit, the solid-liquid separation unit and the evaporation unit were operated in a continuous flow process.

[S503: Observation of the Physical Properties Reflecting the Molecular Weight of the Recycled Resin]

In recovering the recycled resin continuously at the evaporation unit of the recycled resin manufacturing apparatus (pilot plant), using the equipped vibration type viscometer, the melt viscosity of the recycled resin at 150° C. was observed on line. The melt viscosity was 299 mPa·s.

[S504: Acquisition of a Relationship between the Molar Ratio of the Second Monomer to the First Monomer and the Molecular Weight of the Recycled Resin]

When a flow rate of the aqueous solution of formalin was 14.7 kg/hr, the molar ratio of formaldehyde to phenol (second monomer to first monomer) in the reaction system was calculated, and it was 0.51. Furthermore, from the melt viscosity of the recycled resin observed with the vibration type viscometer and the correlation equation of FIG. 14, the weight average molecular weight (Mw) of the recycled resin was estimated to be $2.6 \times 10^3$.

[S505: Determination of whether the Molecular Weight of the Recycled Resin Reaches the Set Value]

The weight average molecular weight (Mw) of the recycled resin at a flow rate of 14.7 kg/hr of the aqueous solution of formalin was $2.6 \times 10^3$, which was smaller than the target range of $2.7 \times 10^3$ to $3.3 \times 10^3$, so that it was determined that the molecular weight did not reach the set value.

[S506: Redetermination of the Amount of the Second Monomer (1st Time)]

In order to increase the molecular weight of the recycled resin, the molar ratio of formaldehyde to phenol (second monomer to first monomer) was redetermined to be 0.53, so that the flow rate of the aqueous solution of formalin was increased from 14.7 kg/hr to 16.1 kg/hr using the formalin pump of the supply unit of the recycled resin manufacturing apparatus (pilot plant).

Incidentally, an operation to change the flow rate of the aqueous solution of formalin was carried out while an operation of the recycled resin manufacturing apparatus (pilot plant) was not halted. Furthermore, other conditions except for the flow rate of the aqueous solution of formalin were not changed at all.

The melt viscosity of the recycled resin recovered through the steps of from S502 to S505 was 406 mPa·s. From the relational expression of FIG. 14, the weight average molecular weight (Mw) of the recycled resin was estimated to be $3.6 \times 10^3$, which was greater than the target range of $2.7 \times 10^3$ to $3.3 \times 10^3$, so that it was determined that the molecular weight did not reach the set value.

[S506: Redetermination of the Amount of the Second Monomer (2nd Time)]

In order to lower the molecular weight of the recycled resin, the molar ratio of formaldehyde to phenol (second monomer to first monomer) was redetermined to be 0.52, so that the flow rate of the aqueous solution of formalin was lowered from 16.1 kg/hr to 15.6 kg/hr using the formalin pump of the supply unit of the recycled resin manufacturing apparatus (pilot plant).

Incidentally, an operation to change the flow rate of the aqueous solution of formalin was carried out while an operation of the recycled resin manufacturing apparatus (pilot plant) was not halted. Furthermore, other conditions except for the flow rate of the aqueous solution of formalin were not changed at all.

Through the steps of from S502 to S505, the melt viscosity of the recovered recycled resin was 333 mPa·s. From the relational expression of FIG. 14, the weight average molecular weight (Mw) of the recycled resin was estimated to be $3.0 \times 10^3$, which was within the target range of $2.7 \times 10^3$ to $3.3 \times 10^3$, so that it was determined that the molecular weight reached the set value.

[S507: Obtaining the Recycled Resin]

The flow rate of the aqueous solution of formalin was set to be constant, i.e., 15.6 kg/hr, and the recycled resin manufacturing apparatus (pilot plant) was operated for about 6 hours to obtain a recycled resin.

After completion of operation of the recycled resin manufacturing apparatus (pilot plant), the obtained recycled resin was analyzed by GPC and as a result, the weight average molecular weight (Mw) was $3.2 \times 10^3$, which was finally confirmed to be within the target range of $2.7 \times 10^3$ to $3.3 \times 10^3$.

In the Example, the melt viscosity of the recycled resin is controlled by changing its set value of the flow rate of the formalin pump manually, whereby a recycled resin having a target molecular weight is obtained. However, these systems can also be controlled automatically. For example, the target value of the melt viscosity is set and information on the measured melt viscosity is fed back to the formalin pump such that the flow rate of the aqueous solution of formalin is PID-controlled, whereby a system can be implemented so as to obtain a recycled resin having a target melt viscosity.

The invention claimed is:

1. A method for producing a recycled resin, comprising:
   providing a polymer material containing a resin component composed of a first monomer which is a phenolic compound, and a second monomer which is an aldehyde compound;
   providing a plurality of recycled resin samples, each of which is produced by chemically decomposing the resin component in a mixture of said polymer material with said first monomer or a derivative of said first monomer, and mixing the decomposed resin component with said second monomer or a derivative of said second monomer, in which said providing the plurality of recycled resin samples, the plurality of recycled resin samples has a different second/first monomer ratio from each other, the second/first monomer ratio being a molar ratio of an amount of the second monomer or the derivative of said second monomer derived from said polymer material and the mixed second monomer or the derivative of said second monomer to an amount of the first monomer or the derivative of said first monomer derived from said polymer material and the mixed first monomer or the derivative of said first monomer, in a reaction system for producing said recycled resin samples;

acquiring a relationship in advance between the second/first monomer ratio and a physical property of said recycled resin samples;

acquiring data of a correlation between said physical property of said recycled resin samples and the second/first monomer ratio;

determining a first range of the second/first monomer ratio in which when the second/first monomer ratio becomes small, said physical property of said recycled resin samples becomes small;

determining a second range of the second/first monomer ratio which is smaller than and adjacent to the first range of the second/first monomer ratio, in which when the second/first monomer ratio becomes small, said physical property of said recycled resin samples substantially does not change;

determining a threshold value as a boundary value between the first range of the second/first monomer ratio and the second range of the second/first monomer ratio;

determining an addition amount of said first monomer or the derivative of said first monomer to be added to said polymer material based on said data of the correlation and so that the second/first monomer ratio is not less than the threshold value; and producing said recycled resin by chemically decomposing the resin component in the mixture of said polymer material with said first monomer or the derivative of said first monomer, and mixing said second monomer or the derivative of said second monomer in said addition amount determined with said decomposed resin component.

2. The method for producing a recycled resin according to claim 1, in which said physical property is a measurement value obtained by one or more methods selected from any of a method of measuring physical properties, a method for separation and analysis, spectrum analysis, electromagnetic analysis and thermal analysis.

3. The method for producing a recycled resin according to claim 2, in which a molecular weight of said recycled resin is calculated from said physical property.

4. The method for producing a recycled resin according to claim 1, in which, at determining said addition amount of said second monomer or the derivative of said second monomer to be added is that said addition amount of said second monomer or the derivative of said second monomer to be added to said decomposed resin component is determined by selecting said proportion corresponding to said physical property to be desired from said relationship.

5. The method for producing a recycled resin according to claim 1, in which the method further comprises separating said decomposed resin component from the mixture of said polymer material with said first monomer or the derivative of said first monomer, and said recycled resin is produced by adding said second monomer or the derivative of said second monomer in said addition amount or the derivative of said second monomer to a decomposition product of said separated resin component.

6. The method for producing a recycled resin according to claim 1, in which said phenolic compound is one or more kinds selected from phenol, o-cresol, m-cresol and p-cresol.

7. The method for producing a recycled resin according to claim 1, in which said aldehyde compound is one or more kinds selected from formaldehyde, paraformaldehyde, trioxane and hexamethylenetetramine.

8. The method for producing a recycled resin according to claim 1, in which said polymer material contains a crosslinked polymer.

9. The method for producing a recycled resin according to claim 8, in which said crosslinked polymer is a phenol resin, a melamine resin, a urea resin or an epoxy resin.

10. The method for producing a recycled resin according to claim 1, wherein, determining an addition amount of said second monomer or the derivative of said second monomer to be added to said decomposed resin component based on said relationship is performed and so that the second/first monomer ratio is less than 1.0.

11. The method for producing a recycled resin according to claim 1, wherein, the threshold value is 0.4.

12. The method for producing a recycled resin according to claim 1, wherein said physical property reflects a molecular weight of said recycled resin samples produced in said reaction system.

* * * * *